US012007706B2

(12) United States Patent
Ao

(10) Patent No.: US 12,007,706 B2

(45) Date of Patent: Jun. 11, 2024

(54) DEVELOPING CARTRIDGE

(71) Applicant: JIANGXI YIBO E-TECH CO. LTD., Xinyu (CN)

(72) Inventor: Shiping Ao, Xinyu (CN)

(73) Assignee: JIANGXI YIBO E-TECH CO. LTD., Xinyu (CN)

(*) Notice: Subject to any disclaimer, the term of this patent is extended or adjusted under 35 U.S.C. 154(b) by 0 days.

(21) Appl. No.: 18/105,750

(22) Filed: Feb. 3, 2023

(65) Prior Publication Data

US 2023/0185217 A1 Jun. 15, 2023

Related U.S. Application Data

(63) Continuation of application No. PCT/CN2021/109825, filed on Jul. 30, 2021.

(30) Foreign Application Priority Data

Aug. 10, 2020 (CN) ......................... 202010797484.2
Aug. 11, 2020 (CN) ......................... 202010803884.X
Feb. 4, 2021 (CN) ......................... 202110151322.6

(51) Int. Cl.
*G03G 15/08* (2006.01)

(52) U.S. Cl.
CPC ..... *G03G 15/0881* (2013.01); *G03G 15/0865* (2013.01)

(58) Field of Classification Search
CPC ............. G03G 15/0865; G03G 15/087; G03G 15/0872; G03G 15/0881; G03G 15/0882;
(Continued)

(56) References Cited

U.S. PATENT DOCUMENTS

2020/0103817 A1* 4/2020 Wang ................. G03G 21/1647

FOREIGN PATENT DOCUMENTS

CN 102645875 A 8/2012
CN 103229111 A 7/2013
(Continued)

OTHER PUBLICATIONS

PCT/CN2021/109825 international search report.
PCT/CN2021/109825 international search authority written opinion.

*Primary Examiner* — Hoang X Ngo
(74) *Attorney, Agent, or Firm* — IPro, PLLC

(57) ABSTRACT

The present invention provides a developing cartridge, the developing cartridge comprises: a developer roller that can rotate about an axis extending in a first direction; a housing having a developer accommodating portion that can accommodate a developer, including a first side and a second side disposed opposite to the first side in the first direction; an input gear disposed on the first side of the housing; and a chip assembly comprising a chip, which is mounted on the housing and located on the second side of the housing; wherein a developer filling port and a cap are further provided on the second side of the housing, developer can be filled into the developer accommodating portion through the developer filling port, the cap is used to seal the developer filling port so as to prevent the developer from leaking from the developer filling port, and wherein projection of at least a part of the chip assembly along the first direction is overlapped with overlaps projection of a part of the cap along the first direction when the chip assembly and the cap are projected in the first direction.

15 Claims, 17 Drawing Sheets

(58) Field of Classification Search
CPC ........... G03G 15/0886; G03G 21/1647; G03G 21/1676; G03G 21/1821; G03G 21/1842
See application file for complete search history.

(56) References Cited

FOREIGN PATENT DOCUMENTS

| | | | |
|---|---|---|---|
| CN | 103782243 | A | 5/2014 |
| CN | 105390416 | A | 3/2016 |
| CN | 106919026 | A | 7/2017 |
| CN | 106919030 | A | 7/2017 |
| CN | 110557962 | A | 12/2019 |
| CN | 110709782 | A | 1/2020 |
| CN | 111338191 | A | 6/2020 |
| CN | 111902776 | A | 11/2020 |
| CN | 112114506 | A | 12/2020 |
| CN | 112714892 | A | 4/2021 |
| CN | 112752998 | A | 5/2021 |
| CN | 213517891 | U | 6/2021 |
| CN | 114077175 | A | 2/2022 |
| CN | 216133307 | U | 3/2022 |
| CN | 216133308 | U | 3/2022 |
| CN | 216133309 | U | 3/2022 |
| CN | 216133310 | U | 3/2022 |
| DE | 212021000253 | U1 | 8/2022 |
| WO | 2020045763 | A1 | 3/2020 |
| WO | 2020046339 | A1 | 3/2020 |

* cited by examiner

DEVELOPING CARTRIDGE

TECHNICAL FIELD

The present invention relates to a developing cartridge, a drum cartridge used in cooperation with the developing cartridge, and an image forming device.

BACKGROUND

A tandem color laser printer including a plurality of photosensitive drums and a plurality of developing cartridges has been widely known as an image forming device. The plurality of photosensitive drums may be accommodated in a drum cartridge movable relative to the image forming device. The drum cartridge may accommodate a plurality of photosensitive drums capable of performing development on yellow, red, blue and black developer images. The plurality of photosensitive drums are disposed in parallel along a predetermined direction and spaced apart by a certain distance. The plurality of developing cartridges accommodating yellow, red, blue and black developers can be inserted into the drum cartridge, and supply the developers to the plurality of photosensitive drums, respectively, so as to perform printing jobs.

With the development of current image forming technology, not only higher requirements are put forward on the material and structure of the drum cartridge, but also higher requirements are put forward on the developing cartridge. It is required that not only the developing cartridge can supply the developer to the drum cartridge stably, but also it performs information exchange with the drum cartridge or the image forming device so as to grasp the relevant information of the developing cartridge. Moreover, it is required that the developing cartridge will not cause damage to the components of the developing cartridge and the drum cartridge during installation, execution of printing tasks, and other links after stopping printing tasks, so that various actions can be performed accurately and stably. Therefore, it is necessary to further improve the existing developing cartridge, so that the developing cartridge can better cooperate with the drum cartridge, so as to cooperate with the image forming device to execute printing tasks for forming better images.

SUMMARY

The present invention is to further develop the above prior art. The present invention provides a developing cartridge comprising:

a developer roller that can rotate about an axis extending in a first direction;

a housing having a developer accommodating portion that can accommodate a developer, including a first side and a second side disposed opposite to the first side in the first direction;

an input gear disposed on the first side of the housing; and a chip assembly comprising a chip, which is mounted on the housing and located on the second side of the housing;

wherein a developer filling port and a cap are further provided on the second side of the housing, developer can be filled into the developer accommodating portion through the developer filling port, the cover is used to seal the developer filling port so as to prevent the developer from leaking from the developer filling port, and wherein projection of at least a part of the chip assembly along the first direction is overlapped with overlaps projection of a part of the cap along the first direction.

Further, wherein projection of at least a part of the electrical contact portion along the first direction overlaps projection of a part of the cover along the first direction.

Further, wherein the developing cartridge is configured to be detachably mounted in a drum cartridge and configured to be pushed into an image forming device together with the drum cartridge along a pushing direction Further, when viewed from the second side along the first direction, the chip assembly covers a right side part of the cap and exposes a left side part of the cap, and the right side part is a part of the cap located on a downstream side in the pushing direction.

Further, the housing has a top wall, a mounting portion for mounting the chip assembly is provided on the top wall, and the cap is disposed on a surface of the housing adjacent to the top wall.

Further, the housing has a top wall, a mounting portion for mounting the chip assembly is provided on the top wall, when viewed from the second side along the first direction, the chip assembly simultaneously covers a right side part and an upper side part of the cap, the upper side part is a part of the cover close to the top wall, and the right side part is a part of the cap located on a downstream side in the pushing direction of the drum cartridge.

Further, the chip has an electrical contact portion, and in a direction simultaneously perpendicular to the pushing direction of the drum cartridge and the first direction, a distance of the electrical contact portion from a top wall of the housing is smaller than a distance of the electrical contact portion from the developer roller.

Further, when viewed from the second side in the first direction, the chip assembly covers a part of the cap.

Further, in a direction simultaneously perpendicular to the pushing direction of the drum cartridge and the first direction, the housing has an imaginary centerline, and the chip, the developer filling port and the cap are all disposed on an upper side of the imaginary centerline.

Further, an anti-misinstallation portion is provided on the top wall of the housing, and the anti-misinstallation portion has a groove extending along the pushing direction.

Further, the chip assembly is L-shaped as a whole.

In the developing cartridge of the present invention, by overlapping the chip assembly and the developer filling port and the cover on the housing, the developing cartridge can be miniaturized. Moreover, the chip assembly is mounted on the axial outer side of the housing to cover the cover, which can limit the position of the cover to prevent the cover from coming off. The developing cartridge has a simple structure and stable performance.

DETAILED DESCRIPTION

In order to make the objectives, technical solutions and technical effects of the embodiments of the present invention clearer, the technical solution of the developing cartridge of the present invention will be clearly and completely described below in conjunction with the drawings. Obviously, the described embodiments are only preferred embodiments of the present invention, rather than all the embodiments. Based on the embodiments of the present invention, other embodiments obtained by those skilled in the art without creative efforts all belong to the scope of protection of the present invention.

In the following description, a direction in which an axis of rotation of a developer roller extends is referred to as a first direction (also referred to as an axial direction). The first direction is also a direction in which an axis of rotation of a photosensitive drum extends. A second direction is a direction in which an outer circumferential surface of the developer roller is separated from and/or in contact with an outer circumferential surface of the photosensitive drum. The first direction and the second direction cross each other. A third direction is a mounting direction in which the developing cartridge is mounted to a drum cartridge. A moving direction is a direction in which the drum cartridge is mounted into or taken out of an image forming device.

Embodiment 1

Drum Cartridge

As shown in FIGS. 1 to 4 and 13, a developing cartridge 100 of the present invention may be inserted into a drum cartridge 200 and inserted into a main body of an image forming device together with the drum cartridge 200 along the moving direction shown in the figures to perform printing tasks.

Figure 3:
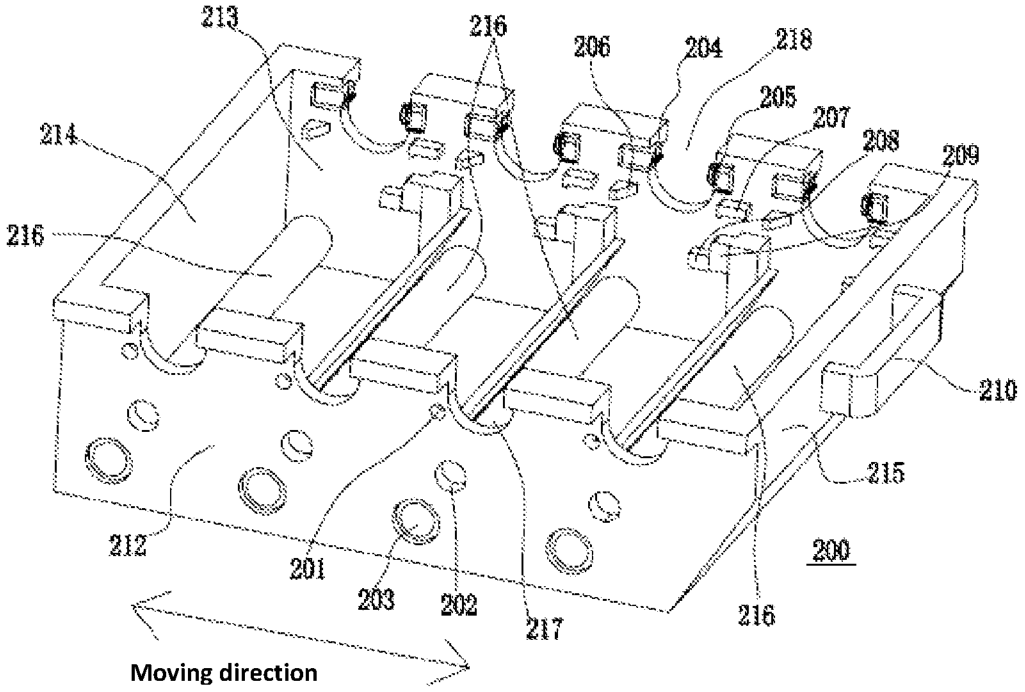
FIG. 3 is a schematic view of a drum cartridge in cooperation with the developing cartridge provided in Embodiment 1 of the present invention.

FIG. 3 is a schematic view of the drum cartridge 200 that is used in cooperation with the developing cartridge 100 of the present invention. The drum cartridge 200 includes a first frame 212, a second frame 213, and a third frame 214 and a fourth frame 215 connecting the first frame 212 and the second frame 213, wherein the first frame 212 and the second frame 213 are spaced apart from each other in the first direction and both extend in the moving direction, and the third frame 214 and the fourth frame 215 are spaced apart from each other in the moving direction and extend in the first direction. Four photosensitive drums 216 are supported by the first frame 212 and the second frame 213, disposed between the third frame 214 and the fourth frame 215 in the moving direction and spaced apart from each other. Each photosensitive drum 216 can rotate about an axis of rotation extending in the first direction. The first frame 212 includes a first accommodating portion 20, a second through hole 202 and a third through hole 203. The first accommodating portion 201 can allow a separation driving assembly in the image forming device to pass through, so that a separating assembly on the developing cartridge 100 may receive a force of the separation driving assembly in the image forming device. In this embodiment, the first receiving portion 201 is configured as a through hole formed on the first frame 212. However, it may also be configured as other structures, such as a recessed portion formed on the first frame 212, as long as it can allow the separating assembly on the developing cartridge 100 to be exposed from the first frame 212 to receive the force from the separation driving assembly in the image forming device. The second through hole 202 allows a developing cartridge driving force input unit (not shown) in the image forming device to pass through, so as to input a driving force to an input gear of the developing cartridge 100 to rotate. The third through hole 203 allows a drum cartridge driving force input unit in the image forming device to pass through, so as to drive the photosensitive drum 216 to rotate. The second through hole 202 and the third through hole 203 may not be configured as hole-like structures, but may be configured as other structures, as long as they can allow the developing cartridge driving force input unit and the drum cartridge driving force input unit in the image forming device to pass through.

A first recessed portion 217 and a second recessed portion 218 are further provided on the first frame 212 and the second frame 213 of the drum cartridge 200, respectively. The first recessed portion 217 and the second recessed portion 218 penetrate the first frame 212 and the second frame 213 in the first direction, respectively, so that at least a part of a first side and at least a part of a second side of the developing cartridge 100 can be exposed outside the first frame 212 and the second frame 213, respectively. In this embodiment, the detected member 60 of the developing cartridge 100 may be exposed outside the first frame 212 through the first recessed portion 217, so that the detected member 60 may be contacted and identified by a detection unit (not shown) in the image forming device. A chip assembly 30 of the developing cartridge 100 is located in the second recessed portion 218 and partially exposed outside the second frame 213. Further, one side of the second recessed portion 218 in the moving direction is provided with a plurality of chip adapter electrical contact portions 204, and an abutting portion 205 is provided on the other side of the second recessed portion 218. Specifically, the chip adapter electrical contact portion 204 is configured as a cylinder made of metal, and can be extended and retracted by a certain distance along the moving direction when receiving an external force. One end of the chip adapter electrical contact portion 204 is electrically connected to an integrated circuit chip 35 of the developing cartridge 100, and the other end of the chip adapter electrical contact portion 204 can be electrically connected to a processing unit in the image forming device, so that the processing unit in the image forming device can read and identify the information related to the developing cartridge stored in the integrated circuit chip 35 of the developing cartridge 100, and establish information exchange with the developing cartridge 100. The abutting portion 205 may abut against one end of a chip assembly 30 (which will be described in detail later) and support the chip assembly 30.

The second frame 213 of the drum cartridge 200 is further provided with a first force receiving member 206, a first pressing portion 207, a supporting portion 208 and an urging member 209.

In this embodiment, the first force receiving member 206 is configured to protrude from the second frame 213 toward the first frame 212 in the first direction, and has an inclined surface 206*a*. The inclined surface 206*a* is inclined with respect to the first direction. The first force receiving member 206 can interact with the separating assembly of the developing cartridge 100 to achieve the function of separating a developer roller 16 in the developing cartridge 100 from the photosensitive drum 216 in the drum cartridge 200. Of course, the first force receiving member 206 may also be disposed in the second recessed portion 218. The position and shape of the first force receiving member 206 may be specifically set according to the position of the separation driving assembly in the image forming device, and are not limited to protruding from the inner side of the second frame 213. It may be set as an inclined surface in the second recessed portion 218.

The first pressing portion 207 can rotate relative to a shaft provided on the second frame 213 and extending in the first direction, and the first pressing portion 207 can rotate between a locked position and a release position. The first pressing portion 207 is also connected with a spring (not shown), and the first pressing portion 207 is pressed toward the locked position by the spring (not shown).

The supporting portion 208 is configured as a protrusion extending from an inner surface of the second frame 213 toward the first frame 212 in the first direction. The supporting portion 208 has a support surface that is perpendicular to the third direction and disposed toward a side opposite to the photosensitive drum 216. Optionally, the supporting portion 208 may also be configured in other shapes and structures, as long as it can function to support the developing cartridge.

The urging member 209 can move in the moving direction, and one end of the urging member 209 may be connected with an elastic member (not shown), so that when the urging member 209 receives a force from the developing cartridge 100, the elastic member can be forced to compress or stretch to move in the moving direction.

In this embodiment, the first frame 212 is also symmetrically provided with a first force receiving member 206, a first pressing portion 207, a supporting portion 208 and an urging member 209, which are paired with the corresponding components on the second frame 213.

Figure 17:
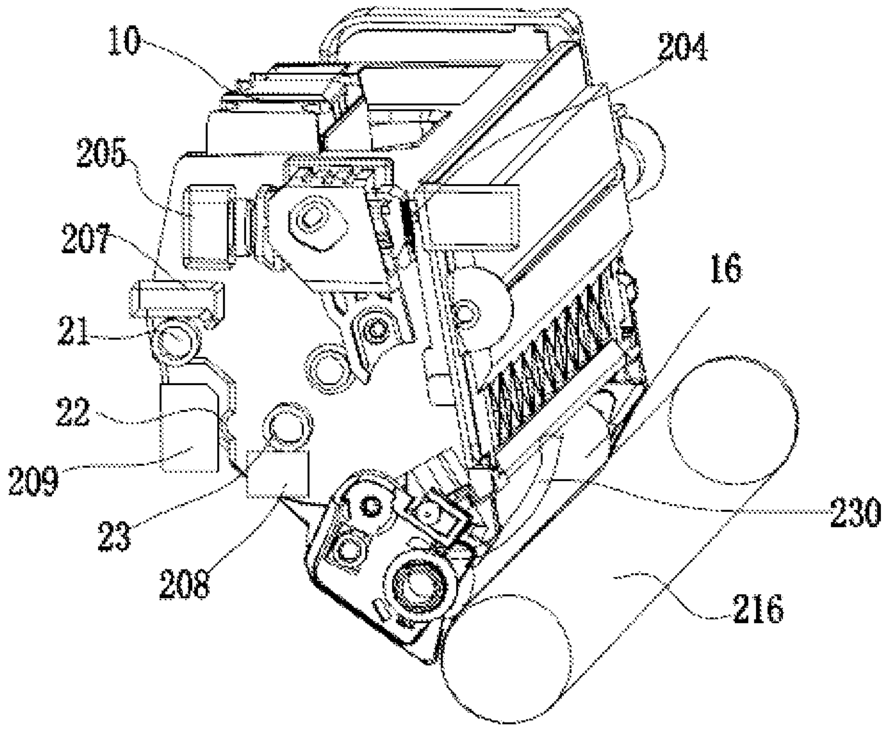
FIG. 17 is a schematic view of the second side of the developing cartridge provided in Embodiment 1 of the present invention when it is inserted into the drum cartridge and in contact with the photosensitive drum.
Figure 18:
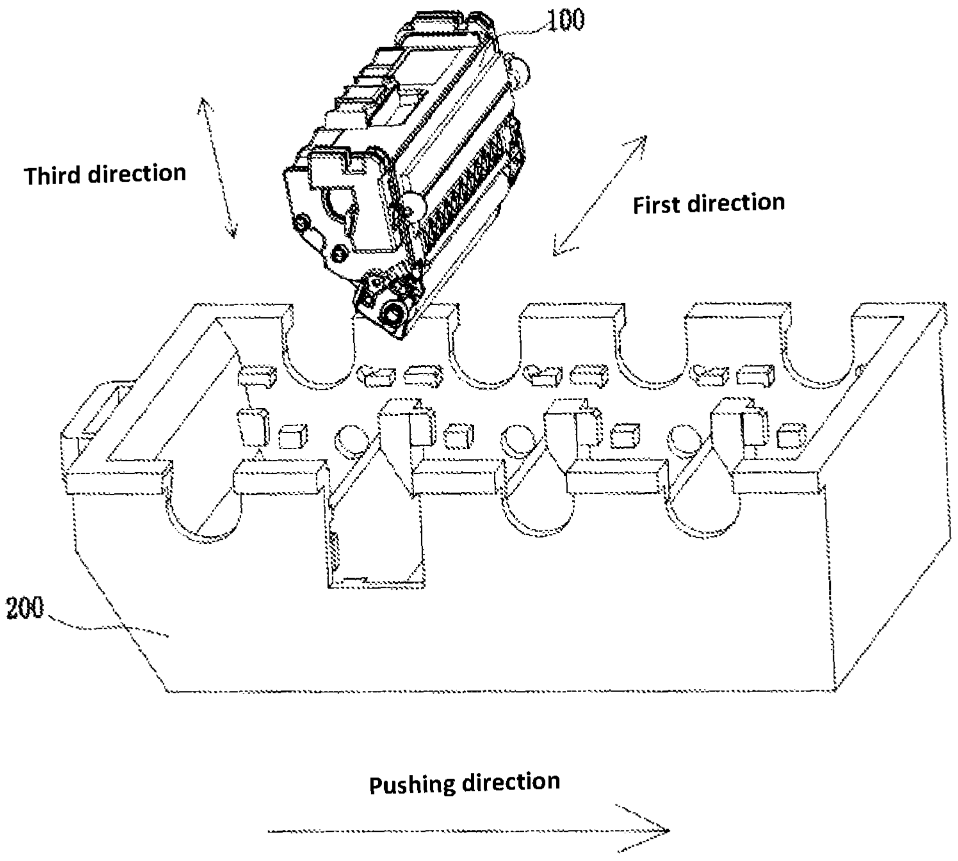
FIG. 18 is a schematic view of a drum cartridge in cooperation with a developing cartridge provided in Embodiment 2 of the present invention.

A second conductive member 230 (as shown in FIG. 17) is further provided on the second frame 213 of the drum cartridge 200. The second conductive member 230 is made of conductive metal, may be elastically deformed, and may be electrically connected to the first conductive member 40 on the developing cartridge 100 to transmit power to the first conductive member 40 on the developing cartridge 100.

Developing Cartridge

Figure 4:
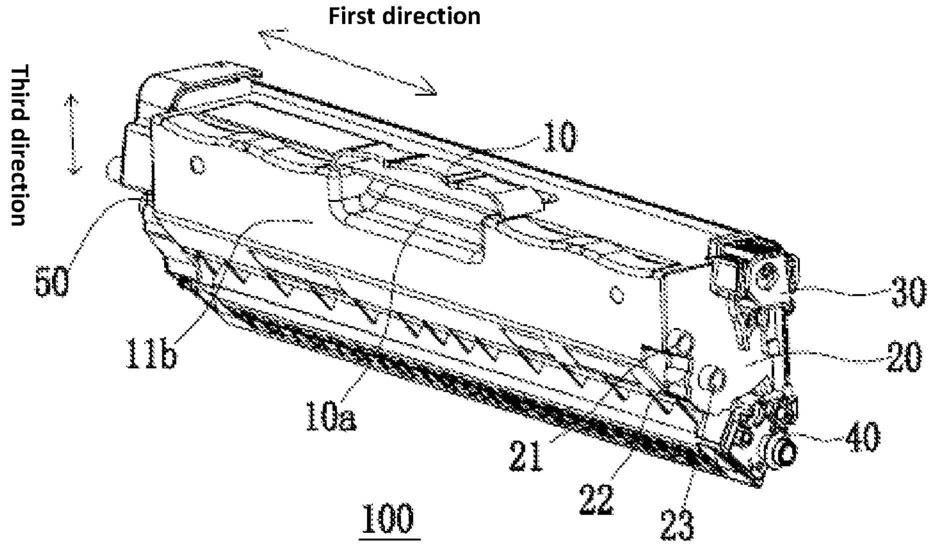
FIG. 4 is a schematic perspective view of the developing cartridge provided in Embodiment 1 of the present invention.
Figure 5:
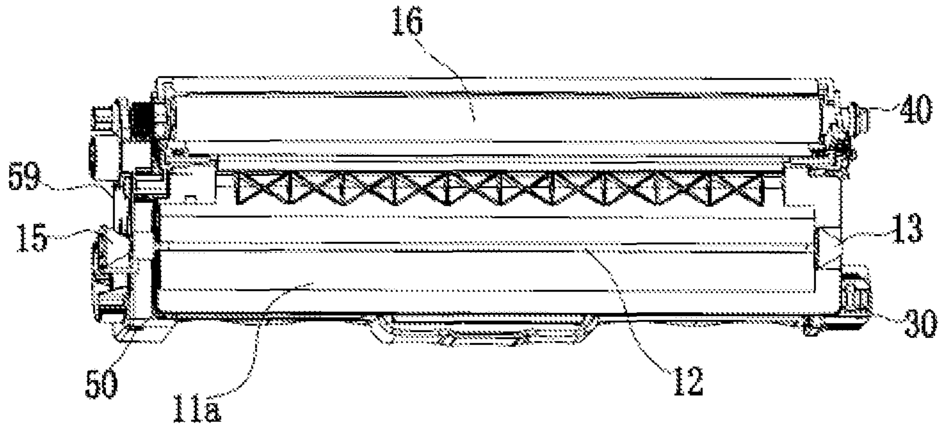
FIG. 5 is a schematic view of the developing cartridge provided in Embodiment 1 of the present invention from another angle.
Figure 6:
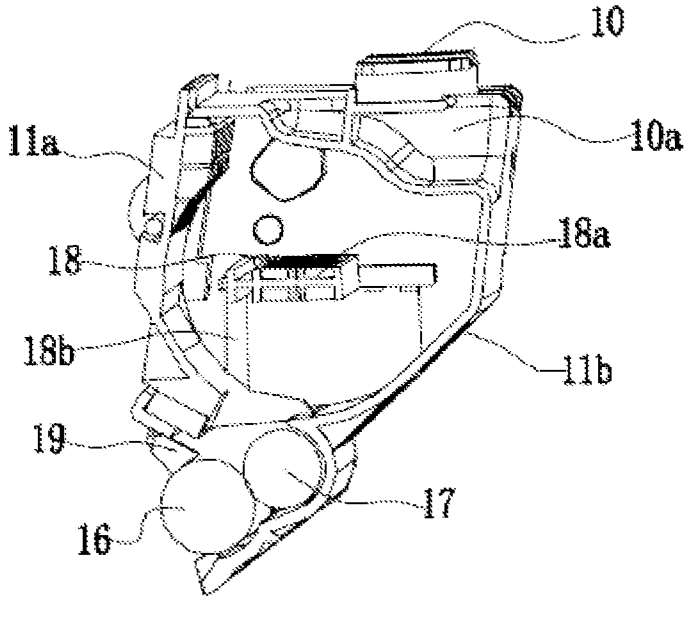
FIG. 6 is a schematic cross-sectional view of the developing cartridge provided in Embodiment 1 of the present invention.

As shown in FIGS. 4 to 6, the developing cartridge 100 in this embodiment includes a housing 11. The housing 11 is configured to accommodate a developer therein, and is formed by welding an upper housing 11*a* and a lower housing 11*b* into a cavity that can accommodate the developer. The housing 11 extends in a first direction, and includes a first side wall 50 and a second side wall 20 that are separated from each other in the first direction.

The housing 11 of the developing cartridge 100 also accommodates an agitator 18. The agitator 18 includes an agitator shaft 18*a* extending in the axial direction and stirring blades 18*b* extending radially outward from the shaft. One end of the stirring blade 18*b* is located on the agitator shaft 18*a*, and the other end of the stirring blade 18*b* is a free end, which may be in contact with the inner wall of the housing 11. When the agitator shaft 18*a* rotates, the stirring blades 18*b* rotate along with the agitator shaft 18*a* to stir the developer accommodated in the housing 11 so as to prevent the developer in the housing 11 from agglomerating, and can convey the developer toward a supply roller 17 and a developer roller 16.

The supply roller 17 is accommodated in the housing 11 of the developing cartridge 100, and is rotatable relative to a supply roller shaft extending in the first direction. Both ends of the supply roller shaft are supported by the first side wall 50 and the second side wall 20 of the housing 11, respectively.

The developer roller 16 is accommodated in the housing 11 of the developing cartridge 100, and is rotatable relative to a developer roller shaft extending in the first direction. Both ends of the developer roller in the axial direction are supported by the first side wall 50 and the second side wall 20 of the housing 11, respectively. The agitator 18 may convey the developer in the housing 11 to the supply roller 17. The supply roller 17 then conveys the received developer to the developer roller 16, and the developer roller 16 receives the developer transmitted by the supply roller 17 and then conveys the developer to the photosensitive drum 216 in the drum cartridge 200, so as to develop an electrostatic latent image on the surface of the photosensitive drum 216. In this embodiment, a part of the developer roller 16 is located on the inner side of the housing 11, and another part of the developer roller 16 is exposed to the outer side of the housing 11.

The developing cartridge 100 further includes a doctor blade 19. The doctor blade 19 is mounted on the housing 11 and in contact with the outer surface of the developer roller 16 to adjust the thickness of the developer on the surface of the developer roller 16.

A gear train and a detected member 60 are further provided outside the first side wall 50 of the developing cartridge 100 of the present invention. A first conductive member 40 and a chip assembly 30 are provided outside the second side wall 20. Moreover, a plurality of protrusions are symmetrically provided outside the first side wall 50 and the second side wall 20. A handle 10 is further provided at the other end opposite to the developer roller 16 in the third direction. A separating assembly is further provided on the upper housing 11*a* of the developing cartridge 100. The structure and function of each component in the developing cartridge will be described in detail below in conjunction with the drawings.

Gear Train

Figure 9:
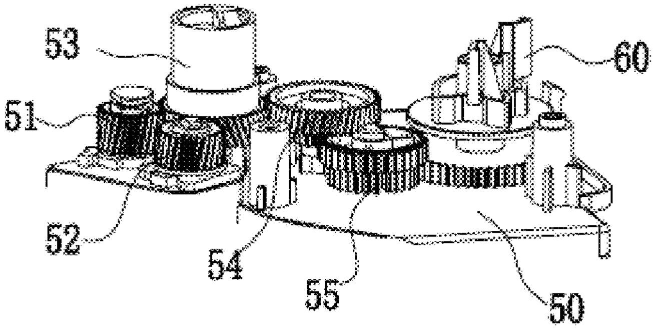
FIG. 9 is a schematic view of the developing cartridge provided in Embodiment 1 of the present invention at the first side wall after a side cover is removed.

As shown in FIG. 9, a gear train is provided outside the first side wall 50 to transmit a driving force received from the image forming device into the developing cartridge 100. The gear train of the developing cartridge 100 of the present invention is disposed outside the first side wall 50, and includes an input gear 53, a developer roller gear 51, a supply roller gear 52, an idler gear 54 and an agitator gear 55. The developer roller gear 51 is mounted on a first end of the developer roller 16 and is rotatable along with the developer roller 16. The supply roller gear 52 is mounted on a first end of the supply roller 17 and is rotatable along with the supply roller 17. The input gear 53 is disposed on the first side wall 50 and is rotatable about an axis (not shown) extending in the axial direction. The input gear 53 can be meshed with a driving force input unit (not shown) in the image forming device to receive the driving force from the image forming device to rotate. The input gear 53 is meshed with the developer roller gear 51 and the supply roller gear 52 separately, so as to transmit the received driving force to the developer roller gear 51 and the supply roller gear 52 separately, thereby driving the developer roller 16 and the supply roller 17 to rotate. The agitator gear 55 is disposed at a first end of the agitator shaft 18*a* and is configured to be rotatable along with the agitator shaft 18*a*. The idler gear 54 is disposed on the first side wall 50 and is rotatable about another axis extending in the axial direction. The idler gear 54 is provided with two different tooth portions in the axial direction, wherein one tooth portion is meshed with the input gear 53, and the other tooth portion is meshed with the agitator gear 55. Therefore, the idler gear 54 may be meshed with the input gear 53 and the agitator gear 55 separately, so as to transmit the driving force of the input gear 53 to the agitator gear 55 to drive the agitator 18 to rotate together. Since the idler gear 54 is disposed between the input gear 53 and the agitator gear 55, the rotation speed of the agitator 18 can be adjusted by adjusting the number of teeth, tooth direction, outer diameter and other parameters of the two tooth portions of the idler gear, so that the parameters such as the rotation speed and direction of the agitator 18 can be adjusted according to actual needs.

Detected Member

Figure 10:
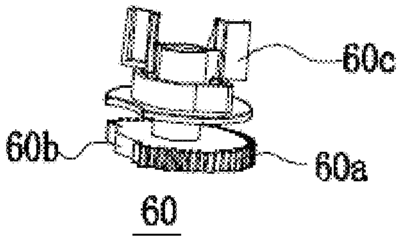
FIG. 10 is a schematic view of a detected member provided in Embodiment 1 of the present invention.

As shown in FIGS. 9 and 10, the detected member of the developing cartridge of the present invention is configured as a detection gear 60, including a toothed portion 60*a*, a tooth-missing portion 60*b* and a detection protrusion 60*c*. When the input gear 53 receives the driving force from the image forming device to rotate and drives the agitator gear 55 to rotate, the detection gear 60 can rotate about an axis on the first side wall 50 to rotate from a first position to a second position. At the first position, the toothed portion 60*a* is meshed with the agitator gear 55, and the detection gear 60 can receive the driving force to rotate, so that the detection protrusion 60*c* disposed on the detection gear 60 is brought into contact with a detection device (not shown) in the image forming device and identified. When the detection gear 60 continues to rotate until the tooth-missing portion 60*b* is opposite to the agitator gear 55, the detection gear 60 can no longer receive the driving force to rotate, and finally is in the second position where the detection is terminated. In order to prevent the detection gear 60 from affecting the rotation of the driving gear train, the detection gear 60 in this embodiment is disposed between the agitator 18 and the rear end of the housing 11 in the third direction of the housing 11. In this way, the space of the developing cartridge can be used reasonably. In this embodiment, the detection protrusions 60*c* are set to two. However, according to the model of the developing cartridge, the number of detection protrusions may be set to multiple, and the shape of the detection protrusions is not limited to the shapes listed in this embodiment.

Protective Cover

Figure 8:
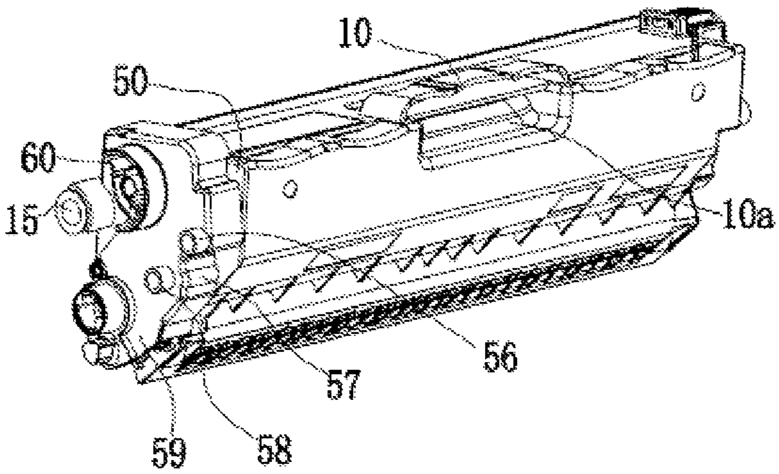
FIG. 8 is a schematic view of a first side wall of the developing cartridge provided in Embodiment 1 of the present invention.

As shown in FIG. 8, a protective cover 59 covering the above gear train is further provided outside the first side wall 50 of the developing cartridge 100 of the present invention. The protective cover 59 can prevent the gear train of the developing cartridge 100 from external interference, so that the gear train can be stably limited between the first side wall 50 and the protective cover 59 in the axial direction, and the gear train can stably transmit the driving force.

A hole portion is provided in the protective cover 59 to expose a part of the input gear 53, so that the input gear 53 receives a driving force from the image forming device. In addition, the detection protrusion 60*c* of the detection gear 60 may also be exposed outside the protective cover 59, so as to facilitate contact with the detection device in the image forming device and identification. The protective cover 59 is further provided with a first protrusion 56, a second protrusion 57 and a third protrusion 58, which each extend outward from the protective cover 59 in the axial direction. Preferably, the first protrusion 56 and the third protrusion 58 are configured to be substantially cylindrical. The first protrusion 56, the second protrusion 57 and the third protrusion 58 may be in contact with the first pressing portion 207, the urging member 209 and the supporting portion 208 (their specific functions will be described in detail later) on the first frame 212 in the drum cartridge 200, respectively. Optionally, the first protrusion 56, the second protrusion 57 and the third protrusion 58 may not be provided on the protective cover 59, and the first protrusion 56, the second protrusion 57 and the third protrusion 58 each extend directly from the first side wall 50 of the housing 11, or one or two of the first protrusion 56, the second protrusion 57 and the third protrusion 58 are provided on the protective cover 59. It is not limited to the methods listed in this embodiment, as long as the functions described later can be realized.

Chip Assembly

Figure 11:
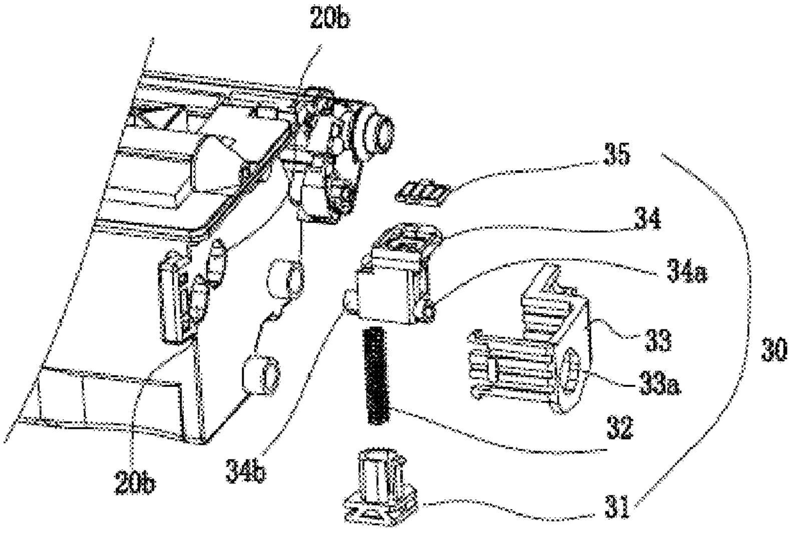
FIG. 11 is a partial exploded schematic view of the developing cartridge provided in Embodiment 1 of the present invention at a second side wall.

As shown in FIGS. 4 and 11, a chip assembly 30 is provided on the second side wall 20 of the developing cartridge 100, and the chip assembly 30 is detachably mounted on the second side wall 20. The chip assembly 30 of the present invention includes an integrated circuit chip 35 as a storage medium and a holder for supporting the integrated circuit chip 35.

The holder is located between the second side wall 20 and a first cover portion 33. The integrated circuit chip 35 can store various information related to the developing cartridge, and the integrated circuit chip 35 includes an electrical contact surface. The electrical contact surface is made of a conductive material, and may be in contact with the chip adapter electrical contact 204, so that the image forming device can be read/write information from/to the integrated circuit chip 35. The holder of the present invention includes a first holding member 34, a second holding member 31, and a second elastic member 32 located between the first holding member 34 and the second holding member 31. The first holding member 34 and the second holding member 31 are preferably made of resin. The first holding member 34 has a first end portion, the second holding member 31 has a second end portion, and the integrated circuit chip 35 is located at the first end portion of the first holding member 34. The second end portion of the second holding member 31 may be abutted against and supported by the abutting portion 205 of the drum cartridge 200.

The second elastic member 32 can extend and retract between a first state and a second state. When the second elastic member 32 is in the first state, the distance between the first end portion of the first holding member 34 and the second end portion of the second holding member 31 is D1; when the second elastic member 32 is in the second state, the distance between the first end portion of the first holding member 34 and the second end portion of the second holding member 31 is D2; and D2 is greater than D1. One end of the second elastic member 32 is abutted against the first holding member 34, the other end of the second elastic member 32 is abutted against the second holding member 31, and the first holding member 34 and the second holding member 31 are meshed with each other and can move relative to each other.

A first boss **34*a* is provided on a side of the first holding member 34 away from the second side wall 20 in the axial direction, and two second bosses 34*b* are provided on a side close to the second side wall 20. A first cover portion 33 is further provided on the second side wall 20 of the developing cartridge 100 of the present invention. The first cover portion 33 can be fixedly mounted on the second side wall 20 and can support and cover at least a part of the holder. The first cover portion 33 includes at least a first hole 33*a*, and the diameter of the first hole 33*a* is larger than the diameter of the first boss 34*a* on the first holding member 34. The second side wall 20 is provided with accommodating holes 20*b* for accommodating the second bosses 34*b* of the first holding member 34, and the diameter of the accommodating hole 20*b* is larger than the diameter of the second boss 34*b*. In this embodiment, the second bosses 34*b* of the first holding member 34 may be inserted into the accommodating holes 20*b* of the second side wall 20, and the first boss 34*a* of the first holding member 34 may be inserted into the first hole 33*a* of the first cover portion 33, so that the first holding member 34 is simultaneously supported by the second side wall 20 and the first cover portion 33. Moreover, since the diameters of the accommodating hole 20*b* and the first hole 33*a* are larger than the outer diameters of the second boss 34*b* and the first boss 34*a*, and the first boss 34*a* and the second boss 34*b* can move relative to the first hole 33*a* and the accommodating hole 20*b*, the first holding member 34 can move relative to the first cover portion 33 and the second side wall 20**.

In this embodiment, the chip assembly 30 is integrally disposed outside the second side wall 20 of the housing 11. Optionally, only a part of the chip assembly 30 may be disposed on the second side wall 20 of the housing 11. For example, only the electrical contact surface of the integrated circuit chip 35 is provided on the second side wall 20 of the housing 11.

First Conductive Member

Figure 12:
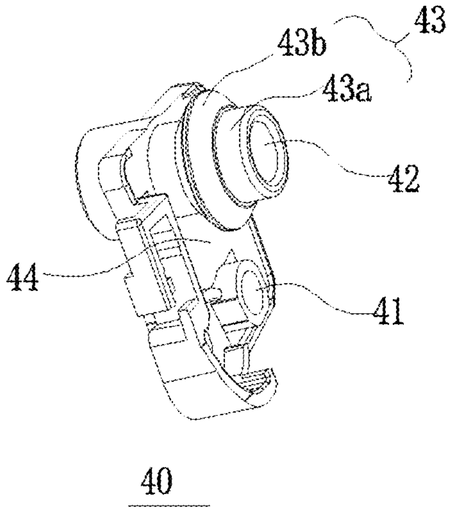
FIG. 12 is a schematic view of a first conductive member of the developing cartridge provided in Embodiment 1 of the present invention.
Figure 13:
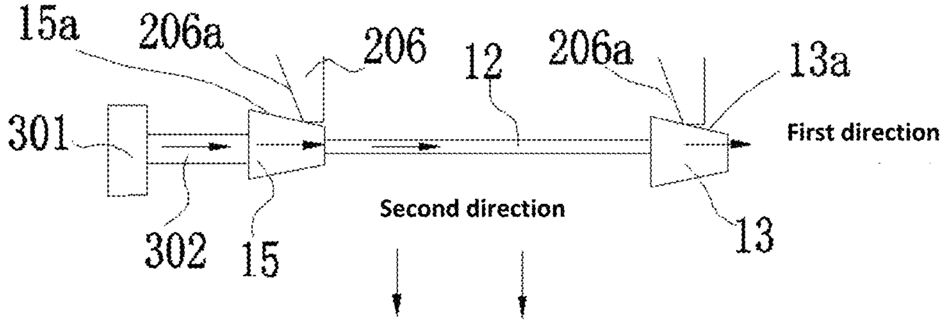
FIG. 13 is a schematic view illustrating the movement of the separating assembly of the developing cartridge provided in Embodiment 1 of the present invention.
Figure 14:
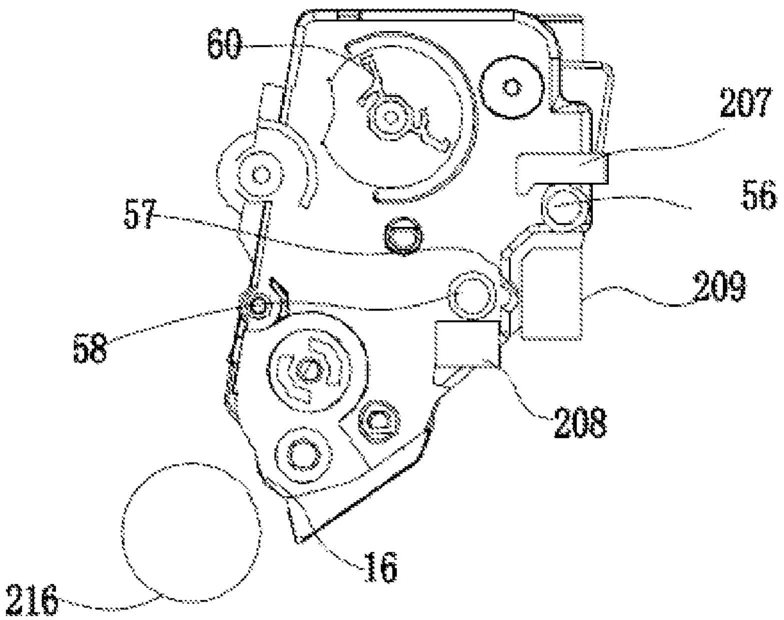
FIG. 14 is a schematic view of a first side of the developing cartridge provided in Embodiment 1 of the present invention when it is inserted into a drum cartridge but not yet in contact with a photosensitive drum.
Figure 15:
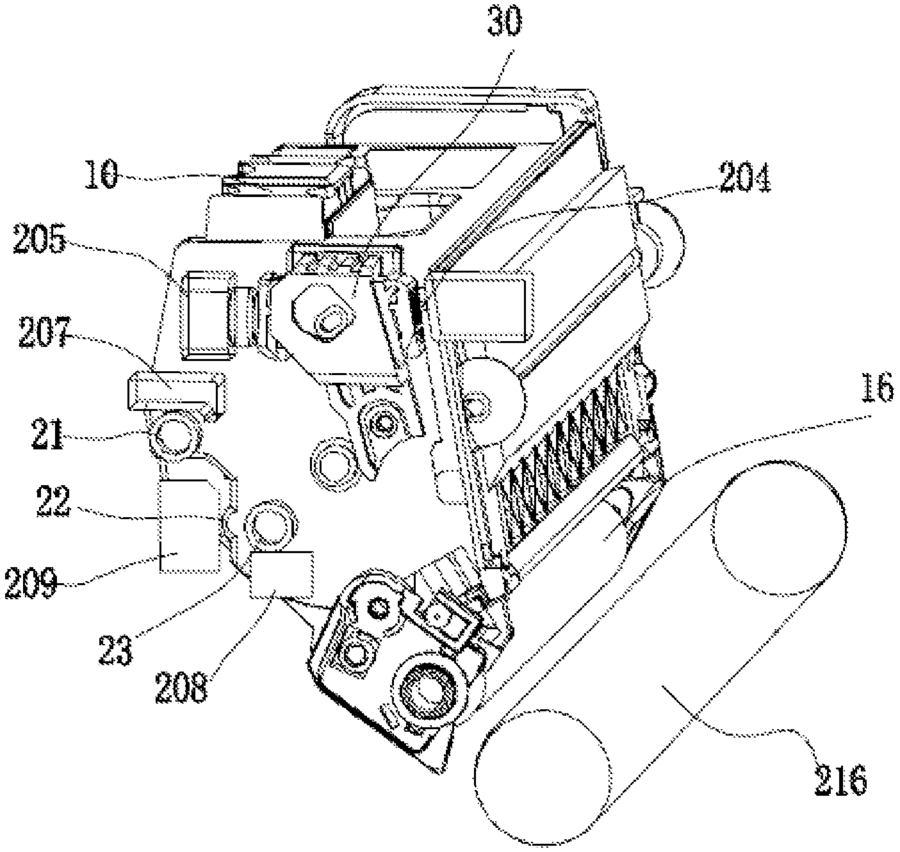
FIG. 15 is a schematic view of a second side of the developing cartridge provided in Embodiment 1 of the present invention when it is inserted into the drum cartridge but not yet in contact with the photosensitive drum.
Figure 16:
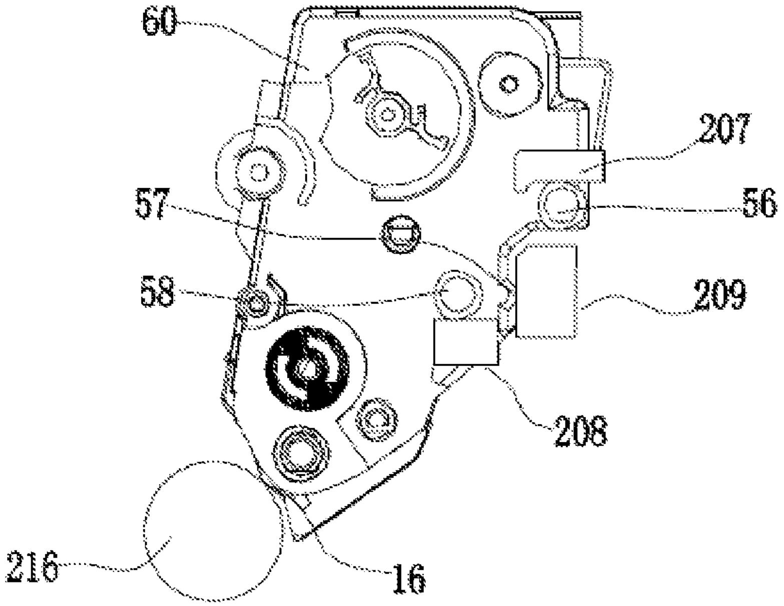
FIG. 16 is a schematic view of the first side of the developing cartridge provided in Embodiment 1 of the present invention when it is inserted into the drum cartridge and in contact with the photosensitive drum.

As shown in FIGS. 4 and 12, the first conductive member 40 of the developing cartridge 100 in this embodiment is disposed on the second side wall 20. The first conductive member 40 is preferably made of conductive resin material, or may optionally be made of conductive metal. The first conductive member 40 includes a first bearing hole 41 and a second bearing hole 42 that can accommodate and support the second end of the supply roller 17 and the second end of the developer roller 16, respectively. In this embodiment, the first conductive member 40 is simultaneously in direct contact with the developer roller 16 and the supply roller 17 to supply electric power to the developer roller 16 and the supply roller 17. The first conductive member 40 integrally includes a base portion 44 and a protruding portion 43 extending outward from the base portion 44 in the axial direction. The base portion 44 is configured in a substantially flat-plate shape, and may be mounted to the second side wall 20 of the housing **11*by* fixing members such as screws. The protruding portion 43 is configured as an annular member, and includes a large-diameter portion 43*b* and a small-diameter portion 43*a*. The large-diameter portion 43*b* may be in contact with the second conductive member 230 of the drum cartridge 200 to receive power transmitted from the second conductive member 230**.

Multiple Protrusions

As shown in FIGS. 3 and 4, a plurality of protrusions are provided on the second side of the developing cartridge 100 shown in this embodiment. The plurality of protrusions include a fourth protrusion 21, a fifth protrusion 22 and a sixth protrusions 23 extending outward from the second side wall 20 in the axial direction. Preferably, the fourth protrusion 21 and the sixth protrusion 23 are configured in a substantially cylindrical shape. The fourth protrusion 21, the fifth protrusion 22 and the sixth protrusion 23 can be in contact with the first pressing portion 207, the urging member 209 and the supporting portion 208 on the second frame 213 in the drum cartridge 200, respectively. (Their specific functions will be described in detail later). As shown in FIGS. 4, 6 and 8, the first side of the developing cartridge 100 is provided with a first protrusion 56, a second protrusion 57 and a third protrusion 58, which specifically extend outward from the protective cover 59 in the axial direction. Preferably, the first protrusion 56 and the third protrusion 58 are configured as substantially cylindrical protrusions. The first protrusion 56, the second protrusion 57 and the third protrusion 58 can be in contact with the first pressing portion 207, the urging member 209 and the supporting portion 208 on the first frame 212 in the drum cartridge 200, respectively. Optionally, one or more of the first protrusion 56, the second protrusion 57 and the third protrusion 58 may also directly extend outward from the first side wall 50, instead of directly extending outward from the protective cover 59. The first protrusion 56, the second protrusion 57 and the third protrusion 58 are separated from the developer roller 16 by different distances in the third direction, which can make the structure of the developing cartridge more compact and the function more stable. In this embodiment, among the plurality of protrusions on the first side of the developing cartridge 100, the first protrusion 56 is the farthest from the developer roller 16 in the third direction, and is closest to the rear end of the developing cartridge 100, so that the first pressing portion 207 of the drum cartridge 200 can more easily press the developing cartridge 100 to make the developing cartridge 100 be in a locked position. Moreover, when a user takes out the developing cartridge 100, it is only necessary to apply a small force to move the developing cartridge 100 from the locked position to the release position and take it out of the image forming device. The third protrusion 58 is closest to the developer roller 16 in the third direction, so that when the developing cartridge 100 is mounted to the drum cartridge 200, the third protrusion 58 may first come into contact with the supporting portion 208 of the drum cartridge 200 and be supported to bear the weight of the developing cartridge 100. Therefore, the impact of the weight of the developing cartridge 100 on the photosensitive drum 216 during the installation of the developing cartridge 100 can be minimized, thereby avoiding damage to the photosensitive drum 216.

Handle

As shown in FIGS. 6 and 8, the developing cartridge 100 of the present invention is further provided with a handle 10 on one end away from the developer roller 16 in the third direction, and a recessed portion 10*a* is further provided on the housing 11 corresponding to the handle 10. When the user needs to mount the developing cartridge 100 into the drum cartridge 200, the user can hold the handle 10 by hand to insert the developing cartridge 100 into the drum cartridge 200. The recessed portion 10*a* can accommodate the user's fingers so as to better hold the developing cartridge 100 stably. Under the action of an external force, the handle 10 of the developing cartridge 100 of this embodiment can be elastically deformed and can be deformed toward the recessed portion 10*a* in the third direction.

Separating Assembly

Figure 7:
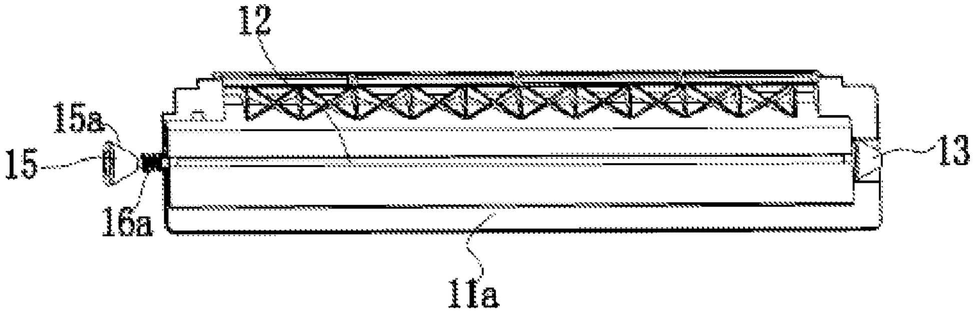
FIG. 7 is a schematic view of an upper housing and a separating assembly of the developing cartridge provided in Embodiment 1 of the present invention.

As shown in FIGS. 3, 4 and 7, the separating assembly of the developing cartridge 100 of the present invention includes a shaft 12, a first cam 15, a second cam 13 and a first elastic member 16*a*. The shaft 12 may be mounted in the upper housing 11*a*, and the upper housing 11*a* is provided with an accommodating portion having a diameter larger than that of the shaft 12. The shaft 12 is movably disposed in the upper housing 11*a*, and can move relative to the upper housing 11*a* in the axial direction. A first end of the shaft 12 is connected with the first cam 15, and a second end of the shaft 12 is connected with the second cam 13. The first cam 15 and the second cam 13 are configured to be mounted to two ends of the shaft 12, respectively. The first elastic member 16*a* is disposed between the first cam 15 and the upper housing 11*a* in the axial direction. In this embodiment, when the first cam 15 is subjected to a force in an axial direction and moves axially close to the second side wall 20, the shaft 12 and the second cam 13 follow the first cam 15 to move axially relative to the upper housing 11*a* and move toward the second side, and at the same time, the first elastic member 16*a* is compressed to generate an elastic restoring force. In this embodiment, the first cam 15 is configured to receive force of a separation driving assembly from the image forming device to move. Optionally, the second cam 13 may receive the force of the separation driving assembly of the image forming device. In short, the separating assembly of the developing cartridge only needs to cooperate with the separation driving assembly disposed on one side of the image forming device, and it is not limited to whether the first cam 15 or the second cam 13 cooperates with the separation driving assembly in the image forming device. Although in this embodiment, it is the first cam 15 that receives the separation driving force from the image forming device, the first cam 15 may be provided as other structures. For example, it is not necessary to provide the first cam 15 and the second cam 13, but it is only necessary that the two ends of the shaft 12 are configured as bosses with inclined surfaces or other similar structures.

How the developing cartridge 100 is mounted to the drum cartridge 200 and how the developer roller 16 and the photosensitive drum 216 are separated in the image forming device will be described in detail in conjunction with the drawings.

Regarding Action when the Developing Cartridge is Mounted to the Drum Cartridge

As shown in FIGS. 13 to 17, when the developing cartridge 100 is inserted into the drum cartridge 200 along the third direction, first, the third protrusion 58 is in contact with and supported by the supporting portion 208 on the first frame 212. In addition, the sixth protrusion 23 is in contact with and supported by the supporting portion 208 of the second frame 213. The weight of the developing cartridge 100 is supported by the supporting portion 208 of the first frame 212 and the supporting portion 208 of the second frame 213. In the process of further inserting the developing cartridge 100 into the drum cartridge 200, the first protrusion 56 moves in the third direction while being in contact with the first pressing portion 207 of the first frame 212, and the fourth protrusion 21 moves in the third direction while being in contact with the first pressing portion 207 of the second frame 213. At this time, the first pressing portion 207 of the first frame 212 and the first pressing portion 207 of the second frame 213 temporarily move to the release position. Then, when the first protrusion 56 and the fourth protrusion 21 separately pass through the first pressing portion 207, the first pressing portion 207 is moved from the release position to the locked position due to the elastic force of the spring. Thus, the first pressing portion 207 on the first frame 212 presses the first protrusion 56 toward the photosensitive drum 216 in the third direction. Similarly, the first pressing portion 207 of the second frame 213 also presses the fourth protrusion 21 toward the photosensitive drum 216 in the third direction. Moreover, the housing 11 of the developing cartridge 100 rotates about the third protrusion 58 and the sixth protrusion 23 relative to the drum cartridge 200. When a positioning protrusion (not shown) disposed on the developing cartridge 100 is in contact with the second frame 213, the housing 11 of the developing cartridge 100 stops rotating, and then, the protruding portion 43 of the first conductive member 40 comes into contact with the second conductive member 230 of the drum cartridge 200. When the housing 11 of the developing cartridge 100 rotates about the third protrusion 58 or after the rotation is stopped, the developing cartridge 100 is pressed by the urging member 209 of the first frame 212 and the urging member 209 of the second frame 213 in the second direction. Specifically, the urging member 209 on the first frame 212 of the drum cartridge 200 presses the second protrusion 57, and the urging member 209 on the second frame 213 of the drum cartridge 200 presses the fifth protrusion 22, so that the developer roller 16 in the developing cartridge 100 is pressed toward the photosensitive drum 216, and thus the outer circumferential surface of the photosensitive drum 216 and the outer circumferential surface of the developer roller 17 are in better contact with each other. In this embodiment, the second protrusion 57 and the fifth protrusion 22 of the developing cartridge 100 are only to better keep the developer roller 16 in contact with the photosensitive drum 216. Optionally, it is possible even if the second protrusion 57 and the fifth protrusion 22 are not provided.

Figure 1:
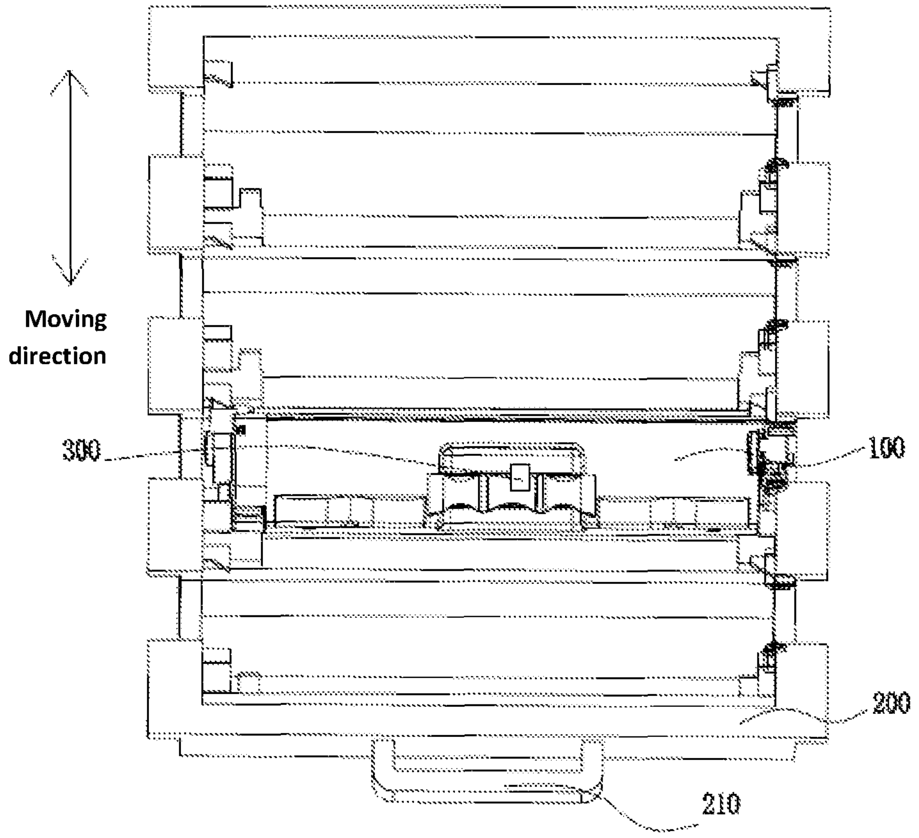
FIG. 1 is a simplified schematic view of a developing cartridge provided in Embodiment 1 of the present invention being inserted into an image forming device together with a drum cartridge along a moving direction.
Figure 2:
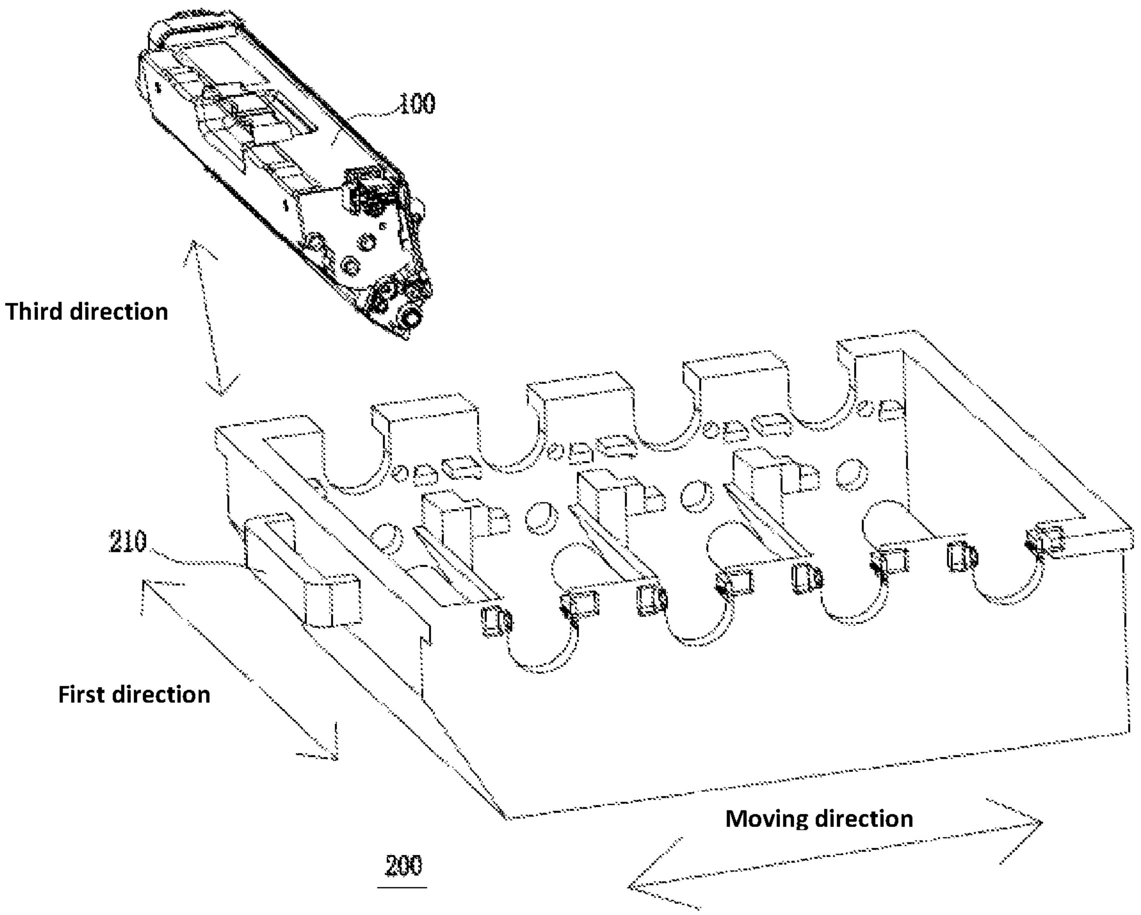
FIG. 2 is a schematic view of the developing cartridge provided in Embodiment 1 of the present invention being mounted on a drum cartridge.

Action when the Developing Cartridge is Mounted to the Image Forming Device Together with the Drum Cartridge In conjunction with FIGS. 1 and 14 to 17, when four developing cartridges 100 accommodating different colors of developers are mounted into the drum cartridge 200, the user may not mount one or more of the multiple developing cartridges 100 into a predetermined position(s) of the drum cartridge 200 due to improper operation, so that the developer roller 16 is mounted into the image forming device in a non-contact position with the photosensitive drum 216. As a result, the developing cartridge 100 cannot normally perform development in the image forming device. In order to avoid that the developer roller 16 and the photosensitive drum 216 are still in a non-contact position and normal printing can be achieved after the developing cartridge 100 is mounted into the image forming device, the image forming device in this embodiment is further provided with a guide convex block 300, and the developing cartridge 100 is provided with a handle 10 matched with it. As shown in FIG. 1, when a user mounts a certain developing cartridge 100 and the drum cartridge 200 that are not mounted in place into the image forming device along the moving direction, the guide convex block 300 in the image forming device presses the handle 10 at the rear end of the developing cartridge 100. Since the handle 10 protrudes from the rear end of the housing 11 and is elastically deformed under force, the housing 11 of the developing cartridge 100 rotates about the third protrusion 58 and the sixth protrusion 23, and the developer roller 16 and the photosensitive drum 216 are forced to move from a separation position to a contact position. Thus, the error that the developing cartridge cannot normally perform the printing task due to improper operation of the user can be avoided.

Regarding Separation Action of the Developer Roller in the Developing Cartridge Away from the Photosensitive Drum When the developing cartridge is located in the image forming device to perform the printing task, if it is only necessary to print black images and not color images, the developer roller in the color developing cartridge needs to be moved away from the photosensitive drum, so that the developer roller comes out of contact with the photosensitive drum.

As shown in FIGS. 4 to 13, how the developer roller 16 in the developing cartridge 100 and the photosensitive drum 216 in the drum cartridge 200 come out of contact is described in detail.

The separation driving assembly in the image forming device includes a separation driving member 301 and a pressing member 302. The separation driving member 301 can drive the pressing member 302 to extend in the first direction and apply a force to the first cam 15, forcing the first cam 15, the shaft 12 connected to the first cam 15 and the second cam 13 connected to the shaft 12 to move axially relative to the upper housing 11*a* and approach the second side wall 20. At the same time, the first elastic member 16*a* is compressed. When the first cam surface 15*a* abuts against the inclined surface 206*a* of the first force receiving member 206, a cam surface 13*a* of the second cam 13 also abuts against the inclined surface 206*a* of the first force receiving member 206 on the second frame 213. At this time, since the first cam 15 continues to be subjected to the axial force of the pressing member 302, the shaft 12 continues to move toward the second frame 213 of the drum cartridge 200, so that the housing 11 of the developing cartridge 100 and the developer roller 16 disposed on the housing 11 also move in the second direction along with the separating assembly, forcing the developer roller 16 and the photosensitive drum 216 to move from the contact position to the separation position. When the developer roller 16 in the developing cartridge 100 and the photosensitive drum 216 are in the separated position, the shaft 12, the first cam 15, the second cam 13 and the first elastic member 16*a* are in the second position in the first direction. The second elastic member 16*a* has a second length.

When the developing cartridge needs to perform a printing task, the separation driving member 301 drives the pressing member 302 to move in the axial direction away from the first cam 15, the pressing force exerted by the pressing member 302 on the first cam 15 is released, and the first cam 15 moves away from the second side wall 20 in the axial direction under the action of the elastic restoring force of the first elastic member 16*a*. The first elastic member 16*a* extends from the second length to a first length, and the first length greater than the second length. Thus, when the shaft 12 moves from the second position back to the first position along with the first cam 15 and the second cam 13, these movements of the shaft 12, the first cam 15 and the second cam 13 cause the housing 11 and the developer roller 16 to also move in the second direction, and the developer roller 16 is brought close to the photosensitive drum 216 in the second direction. As a result, the outer circumferential surface of the developer roller 16 is brought into contact with the outer circumferential surface of the photosensitive drum 216, and thus, the developer roller 16 and the photosensitive drum 216 come into the contact position.

In the embodiment of the present invention, when the developing cartridge 100 moves along the second direction, and the developer roller 16 in the developing cartridge 100 and the photosensitive drum 216 move from the contact position to the separation position, the integrated circuit chip 35 in the developing cartridge 100 is always kept in electrical contact with the chip adapter electrical contact portion 204 in the drum cartridge 200, and does not move relative to the chip adapter electrical contact portion 204. Specifically, as shown in FIG. 17, the developer roller 16 and the photosensitive drum 216 are in the contact position. At this time, one end of the integrated circuit chip 35 of the developing cartridge 100 is supported by the first holding member 34, and the other end abuts against the chip adapter electrical contact portion 204 of the drum cartridge 200. Moreover, the second holding member 31 is abutted by the abutting portion 205 of the drum cartridge 200. At this time, the chip assembly 30 is located in the second recessed portion 218 of the drum cartridge 200, and both ends of the chip assembly 30 are fixedly supported by the drum cartridge 200. When the image forming device needs to perform a separation action, the developing cartridge 100 can move along the second direction toward the side away from the photosensitive drum 216 under the urging of the separation driving member 301 and the pressing member 302 of the image forming device. Thus, the developer roller 16 located in the developing cartridge 100 is separated from the photosensitive drum 216. However, at this time, the chip assembly 30 does not move with the housing 11 of the developing cartridge 100, and both ends of the chip assembly 30 are abutted by the second frame 213 of the drum cartridge 200. Nevertheless, since the diameter of the first hole 33*a* of the first cover portion 33 supporting the first holding member 34 is larger than the diameter of the first boss 34*a* of the first holding member 34, and the diameter of the accommodating hole 20*b* of the second boss 34*b* supporting the first holding member 34 on the second side wall 20 is also larger than the diameter of the second boss 34*b* of the first holding member 34, the chip assembly 30 has a free space for movement relative to the housing 11. When the developing cartridge 100 moves along the second direction, the chip assembly 30 does not move along with the developing cartridge 100.

Embodiment 2

Embodiment 2 of the present invention will be introduced below. For the convenience of description, a side of the first side wall 50 where the input gear 53 is located is referred to as a driving end of the developing cartridge 100, and a side of the second side wall 20 where the first conductive member 40 is located is referred to as a conductive end of the developing cartridge 100. As shown in FIGS. 4 to 6 and 18 to 26, in this embodiment, the integrated circuit chip 35 of the developing cartridge 100 is also disposed on the conductive end of the developing cartridge 100. However, in this embodiment, the orientation of the electrical contact portion 35*a* on the integrated circuit chip 35 is different from that in the first embodiment. In Embodiment 1, a direction in which the electrical contact portion 35*a* of the integrated circuit chip 35 faces is the pushing direction in which the drum cartridge 200 is pushed from the outside of the image forming device into the inside of the image forming device. However, in this embodiment, in order to further enable the electrical contact portion 35*a* of the integrated circuit chip 35 to be far away from the first conductive member 40, the direction in which the electrical contact portion 35*a* of the integrated circuit chip 35 faces is opposite to the pushing direction of the drum cartridge 200. In other words, in this embodiment, the facing direction of the electrical contact portion 35*a* of the integrated circuit chip 35 is toward the upstream side of the pushing direction of the drum cartridge 200. This arrangement can reduce the signal interference of the first conductive member 40 to the electrical contact portion 35 *a* of the integrated circuit chip 35 as much as possible. For example, when the first conductive member 40 inputs a high voltage to the developer roller 16 and the supply roller 17, the above arrangement can reduce the interference of the high voltage to the electrical signal between the electrical contact portion 35*a* of the integrated circuit chip 35 and the image forming device. The developing cartridge 100 also has a developer accommodating portion. The first side wall 50 and the second side wall 20 are two side walls of the developer accommodating portion oppositely arranged in the first direction. A top wall 75 is provided on an upstream side of the developer accommodating portion in the third direction, and a chip cover mounting portion 76 is provided on the top wall 75. Specifically, the top wall 75 and the second side wall 20 have a junction portion, and the chip cover mounting portion 76 is disposed at a position on the top wall 75 close to the junction portion. The chip cover mounting portion 76 is provided with a plurality of holes 76*a*, and the first cover portion 3301 of the integrated circuit chip 35 is provided with a plurality of elastic clamping portions 3301*c* that can be inserted into the plurality of holes 76*a*. The first cover portion 3301 is provided with a second mounting guide portion 3301*a* on the upstream side of the third direction. The second mounting guide portion 3301*a* extends along the pushing direction of the drum cartridge 200. The pushing direction of the drum cartridge 200 is defined as a fourth direction. In the fourth direction, the front end of the second mounting guide portion 3301*a* is provided with a second inclined guide portion 3301*b*, and an extending direction of the second inclined guide portion 3301*b* is configured to form an obtuse angle with the fourth direction. A protective cover 5901 is provided on the first side wall 50, and a first mounting guide portion 5901*a* is provided on the protective cover 5901. The first mounting guide portion 5901*a* extends along the fourth direction. A front end of the first mounting guide portion 5901*a* in the fourth direction is provided with a first inclined guide portion 5901*b*, and an extending direction of the first inclined guide portion 5901*b* is configured to form an obtuse angle with the fourth direction. The first mounting guide portion 5901*a* and the second mounting guide portion 3301*a* abut against the abutting portion (not shown in the figures) in the image forming device. It can be ensured that when the user mounts the developing cartridge 100 into the drum cartridge 200, in the case that the developing cartridge 100 is not mounted to a predetermined position, the developing cartridge 100 is forced to continue to move a certain distance relative to the drum cartridge 200 through the abutment of the first mounting guide portion 5901*a* and the second mounting guide portion 3301*a* with the abutting portion. As a result, the developing cartridge 100 can be mounted to the predetermined position to prevent the wrong positioning of the developing cartridge caused by the user not mounting it in place. The first mounting guide portion 5901*a* and the second mounting guide portion 3301*a* are disposed at two opposite side ends of the developing cartridge 100 in the first direction, and can guide the developing cartridge 100 to be mounted into the drum cartridge 200 more stably. Optionally, only one of the first mounting guide portion 5901*a* and the second mounting guide portion 3301*a* may be provided individually, and the same technical effect can be achieved through the abutment of the one mounting guide portion described above with the abutting portion in the image forming device. In order to ensure the abutment of the mounting guide portion and the abutting portion in the image forming device, in this embodiment, in a fifth direction that is simultaneously perpendicular to the first direction and the fourth direction, it is defined that the developer roller 16 is located on a lower end side of the developing cartridge 100 in the fifth direction, the handle 10 is located on an upper end side in the fifth direction, and upper end surfaces of the first mounting guide portion 5901*a* and the second mounting guide portion 3301*a* are the uppermost end side of the developing cartridge 100 in the fifth direction. In the fifth direction, the electrical contact portion 35*a* of the integrated circuit chip 35 is located between the sixth protrusion 23 and the second mounting guide portion 3301*a*. Further, the developing cartridge 100 has a cap 71 for sealing. The cap

Figure 19:
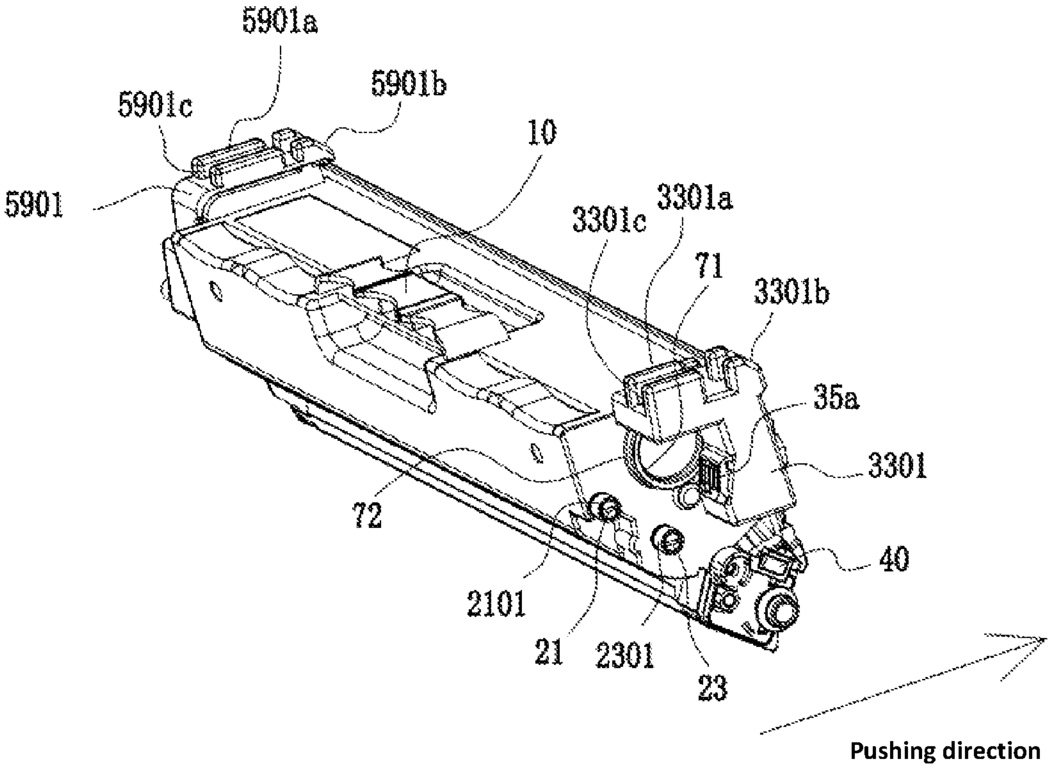
FIG. 19 is a schematic view of a three-dimensional structure of the developing cartridge provided in Embodiment 2 of the present invention.
Figure 20:
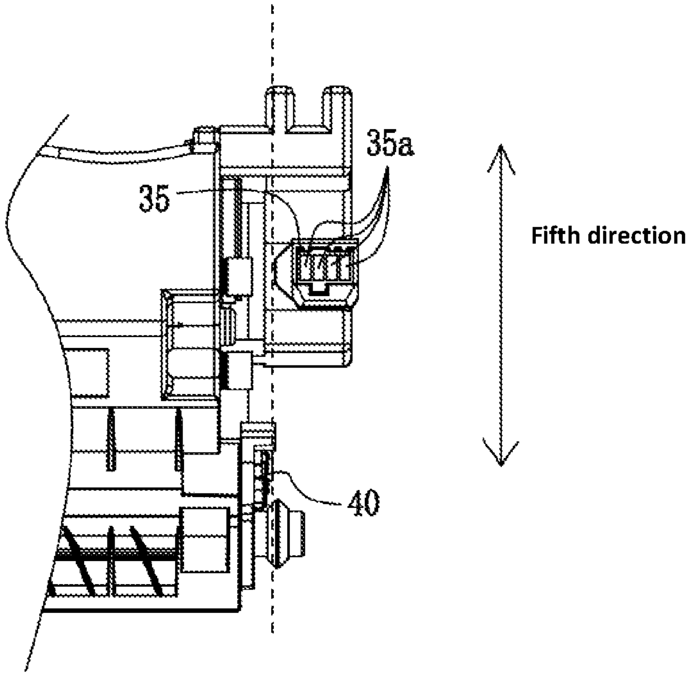
FIG. 20 is a schematic view of a partial structure of a conductive end of the developing cartridge provided in Embodiment 2 of the present invention.
Figure 21:
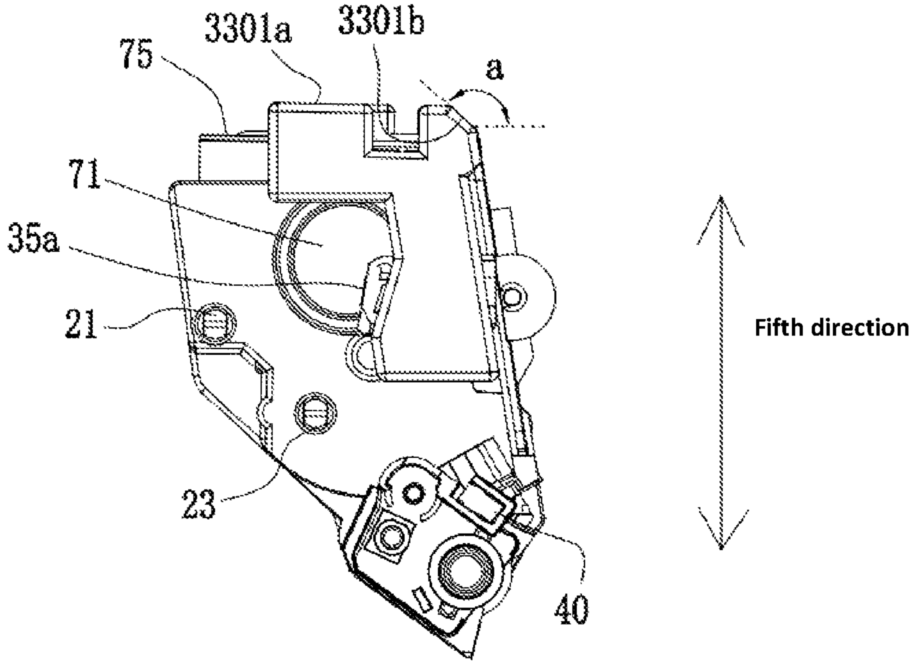
FIG. 21 is a schematic side view of the conductive end of the developing cartridge provided in Embodiment 2 of the present invention.
Figure 22:
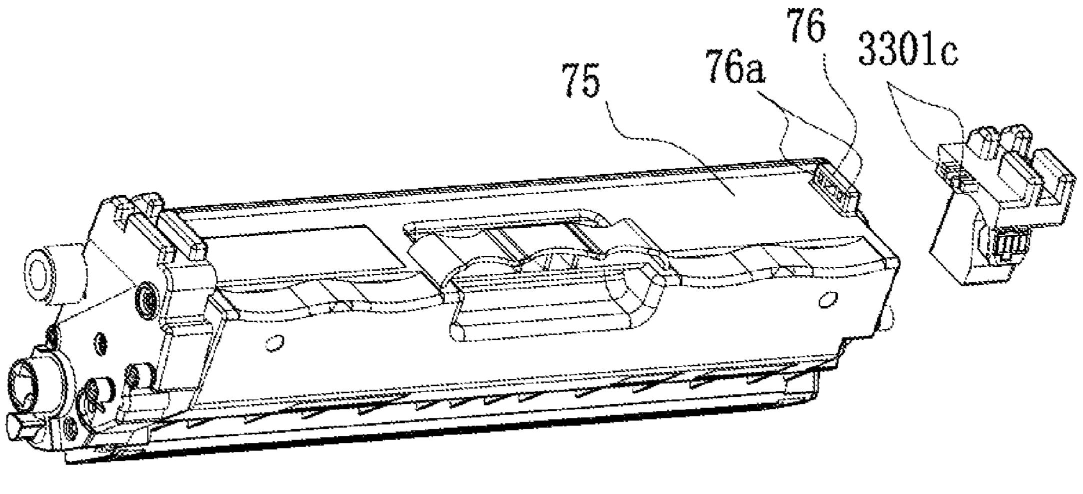
FIG. 22 is a schematic view of an exploded structure of the developing cartridge provided in Embodiment 2 of the present invention at a first cover portion.
Figure 27:
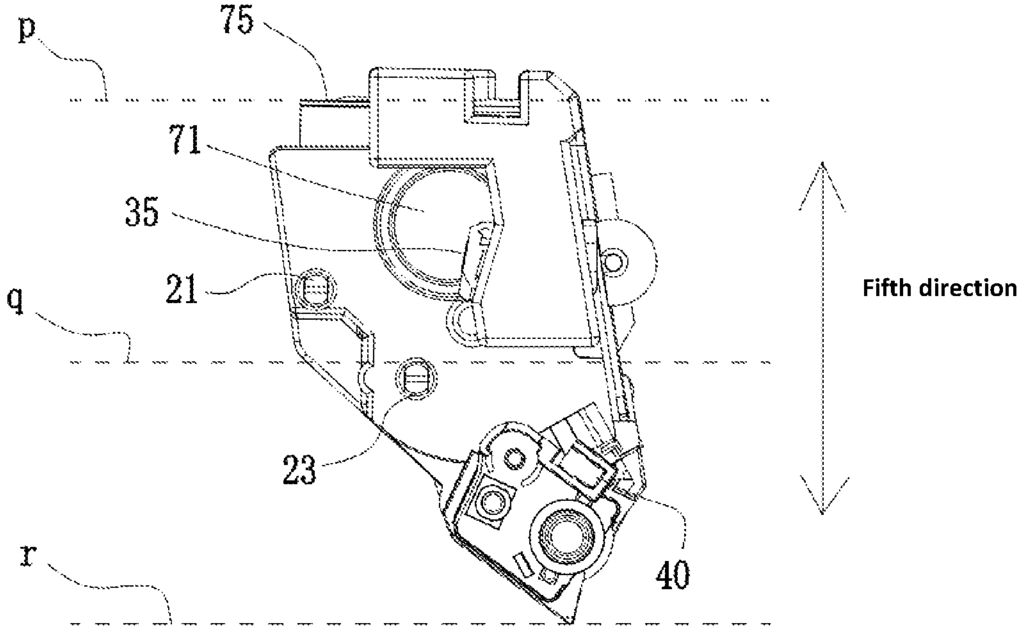
FIG. 27 is a schematic side view of the conductive end of the developing cartridge provided in Embodiment 2 of the present invention.

71 is disposed on the conductive end of the developing cartridge 100. The cap 71 is used for sealing the developer filling port 72 on the developer accommodating portion of the developing cartridge 100. developer can be filled from the developer filling port 72 to the developer accommodating portion, and the cap 71 is used to seal the developer filling port 72 to prevent the developer from leaking. The cap 71 and the electrical contact portion 35*a* of the integrated circuit chip 35 are both disposed on the conductive end of the developing cartridge 100. When projected from the conductive end of the developing cartridge 100 to the driving end along the first direction, at least a part of the electrical contact portion 35*a* of the integrated circuit chip 35 overlaps with the cap 71 and the developer filling port 72. Moreover, when projected from the conductive end of the developing cartridge 100 to the driving end along the first direction, the electrical contact portion 35*a* of the integrated circuit chip 35 and the first conductive member 40 are separated from each other without parts overlapping each other. When viewed along the fourth direction, in the first direction, the electrical contact portion 35*a* of the integrated circuit chip 35 is located outside the first conductive member 40, that is, the electrical contact portion 35*a* is closer to the outside of the developing cartridge 100 than the first conductive member 40 in the first direction. All of the above arrangements can make the electrical contact portion 35*a* of the integrated circuit chip 35 away from the first conductive member 40 as far as possible to reduce electrical signal interference. In the fifth direction, a chip cover mounting portion 76 is located above the cap 71. Further, a first developing cartridge anti-misinstallation portion 5901*c* is further provided on the first guide mounting portion 5901*a*, a second developing cartridge anti-misinstallation portion 3301*c* is further provided on the second guide mounting portion 3301*a*, and the first developing cartridge anti-misinstallation portion 5901*c* and the second developing cartridge anti-misinstallation portion 3301*c* are configured as groove structures extending along the fourth direction. Protruding portions (not shown in the figures) matched with the first developing cartridge anti-misinstallation portion 5901*c* and the second developing cartridge anti-misinstallation portion 5901*c* are provided in the image forming device. When the developing cartridge 100 is mounted in the drum cartridge 200 and is pushed into the image forming device together with the drum cartridge 200, if the first developing cartridge anti-misinstallation portion 5901*c* and the second developing cartridge anti-misinstallation portion 3301*c* are matched with the protruding portions in the image forming device, then it can be properly mounted; but if they cannot be matched, the protruding portions in the image forming apparatus will block the developing cartridge 100 from being mounted. When viewed from the conductive end of the developing cartridge 100 along the first direction, the chip assembly 30 covers a right side part of the cap 71 and exposes a left side part of the cap 71. The above right side part is a part of the cap 71 located on the downstream side in the pushing direction of the drum cartridge 200, Moreover, the chip assembly 30 is mounted on the outer side of the cap 71, so as to restrict the cap 71 from moving outward from the developer filling port 72 of the housing 11 and prevent the cap 71 from coming out of the developer filling port 72 of the housing 11. Further, the chip assembly 30 is L-shaped as a whole. When viewed from the conductive end of the developing cartridge 100 along the first direction, the chip assembly 30 will simultaneously cover the right side part and an upper side part of the cap 71, which can more stably restrict the cap 71 from coming out, the upper side part being a part of the cap 71 close to the top wall 75. Since the developing cartridge 100 is mounted into the drum cartridge 200 from top to bottom, the position of the integrated circuit chip 35 should be disposed as close to the upper side of the top wall 75 as possible, so as to reduce the scratches of the electrical contact portion 35*a* of the integrated circuit chip 35 and the drum cartridge 200 which may be caused during the installation of the developing cartridge 100. Specifically, when viewed from the conductive end of the developing cartridge 100 along the first direction, the electrical contact portion 35*a* of the integrated circuit chip 35 is closer to the upper end side of the developing cartridge 100. In other words, in the fifth direction, the distance of the electrical contact portion 35*a* from the top wall 75 is smaller than the distance of the electrical contact portion 35*a* from the developer roller 16. That is to say, the electrical contact portion 35 *a* is closer to the top wall 75 than the developer roller 16. At the same time, since the developing cartridge 100 adopts a design with a large upper end and a small lower end, the cap 71 and the developer filling port 72 should also be disposed as close to the upper end of the developing cartridge 100 as possible, that is, the cap 71 is disposed at a position adjacent to the top wall 75. Specifically, the developer filling port 72 and the cap 71 are disposed on a surface of the housing 11 adjacent to a surface where the chip cover mounting portion 76 is located. Preferably, the developer filling port 72 and the chip cover mounting portion 76 are disposed adjacent to each other. This design is advantageous to design the size of the developer filling port 72 to be larger to facilitate the developer filling operation. Further, as shown in FIGS. 19 and 27, in the fifth direction, the integrated circuit chip 35, the developer filling port 72 and the cap 71 are both disposed on an upper part of the centerline of the housing 11 in the fifth direction. Specifically, when viewed from the conductive end of the developing cartridge 100 along the first direction, a first imaginary line p that is flush with the top wall 75 of the housing 11 and extends perpendicular to the fifth direction is made, a second imaginary line r that is flush with the bottommost end of the housing 11 and extends perpendicular to the fifth direction is made, the centerline of the housing 11 in the fifth direction is a third imaginary line q located at a center position between the first imaginary line p and the second imaginary line r, and the integrated circuit chip 35, the developer filling port 72 and the cap 71 are all disposed above the third imaginary line q. That is, the housing 11 is divided into upper and lower parts by the third imaginary line q. The integrated circuit chip 35, the developer filling port 72 and the cap 71 are all disposed on the upper half of the housing 11 near the top wall 75. This design makes the structure of the developing cartridge more compact, facilitating the miniaturization of the developing cartridge.

As shown in FIGS. 23 to 26, the chip assembly 30 includes an extension portion 3001 extending in the third direction, and the first conductive member 40 includes a developer roller bearing portion 40*a* and a supply roller bearing portion 40*b*. A developer roller shaft 16*a* is inserted into the developer roller bearing portion 40*a* and supported by the developer roller bearing portion 40*a*, and a supply roller shaft 17*a* is inserted into the supply roller bearing portion 40*b* and supported by the supply roller bearing portion 40*b*. A screw hole 40*c* is provided on the first conductive member 40, a screw hole 11*b*1 is provided on the lower housing 11*b*, and a screw 45 passes through the screw hole 40*c* and is tightened in the screw hole 11*b*1 to mount the first conductive member 40 on the lower housing 11*b*. The extension portion 3001 covers the screw 45. Specifically, when viewed from the conductive end of the developing cartridge 100 along the direction of the axis of the developer roller 16, the screw 45 is covered and shielded by the extension portion 3001. Since the screw 45 mounted on the first conductive member 40 may generate a tip discharge effect, this design can avoid electrical interference to the integrated circuit chip 35 caused by the tip discharge of the screw 45.

Further, in order to allow the developing cartridge to be mounted into the drum cartridge more smoothly and further miniaturized, as shown in FIG. 19, rollers 2101 and 2301 that can rotate about the fourth protrusion 21 and the sixth protrusion 23, respectively, are disposed on the fourth protrusion 21 and the sixth protrusion 23. In the fourth direction, the fourth protrusion 21 is located on the upstream side of the cap 71. In the fifth direction, the sixth protrusion 23 is located on the downstream side of the cap 71. Moreover, in the fourth direction, both the fourth protrusion 21 and the sixth protrusion 23 are disposed on the upstream side of the electrical contact portion 35*a* of the integrated circuit chip 35, and the electrical contact portion 35*a* faces a side where the fourth protrusion 21 and the sixth protrusion 23 are located.

Figure 23:
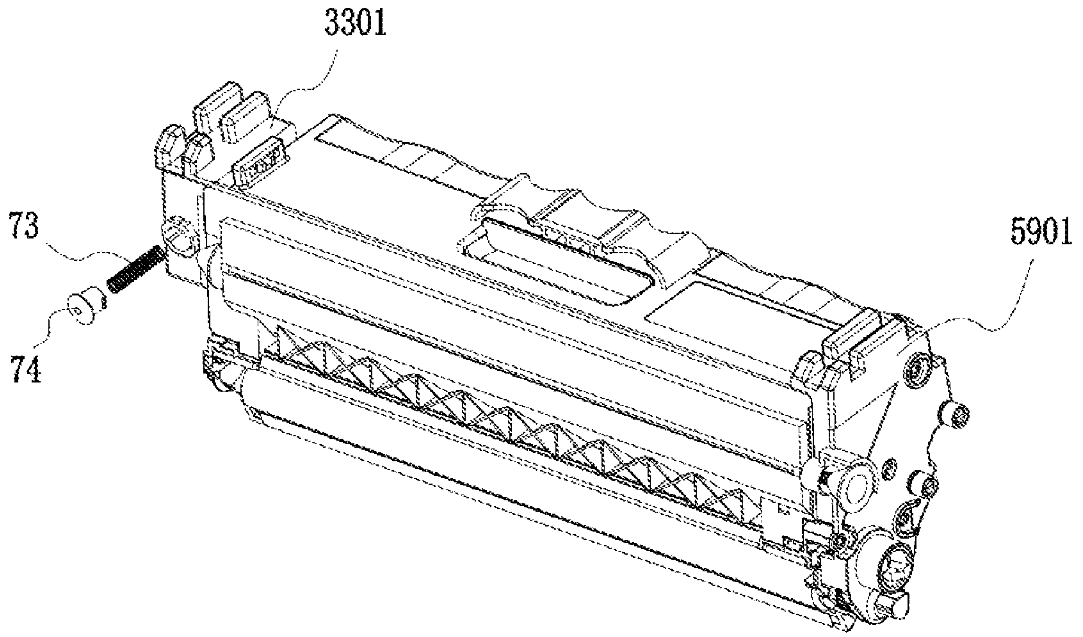
FIG. 23 is a schematic view of a partial exploded structure of a modified example of the developing cartridge provided in Embodiment 2 of the present invention.
Figure 24:
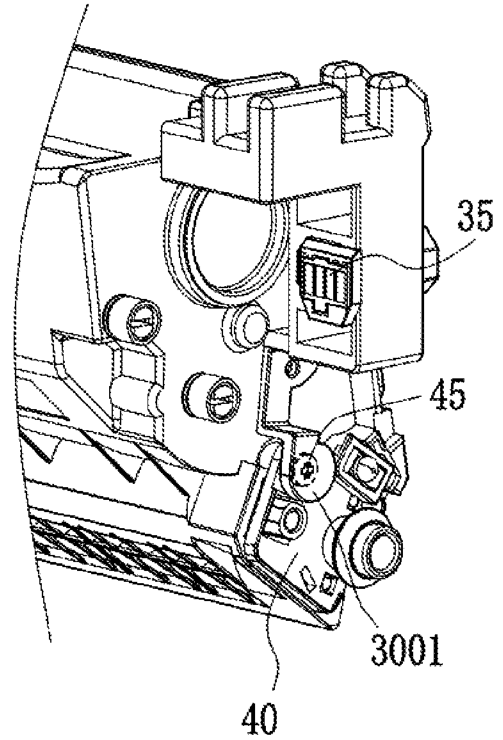
FIG. 24 is a schematic view of a partial structure of another modified example of the developing cartridge provided in Embodiment 2 of the present invention.
Figure 25:
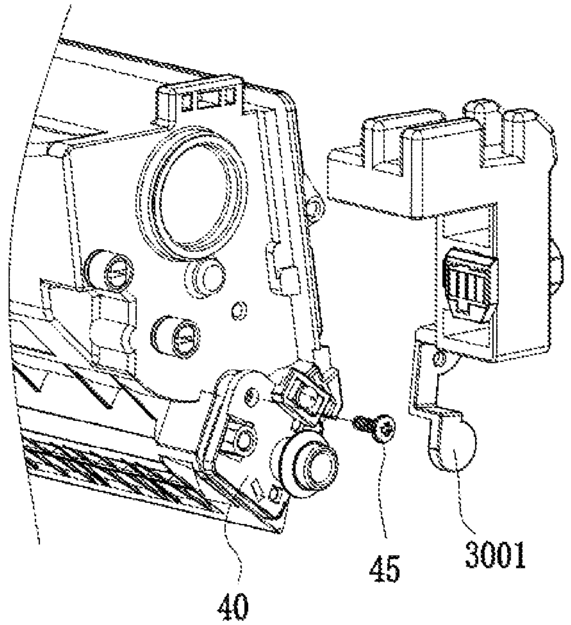
FIGS. 25 and 26 are schematic views of a partial exploded structure of another modified example of the developing cartridge provided in Embodiment 2 of the present invention.
Figure 26:
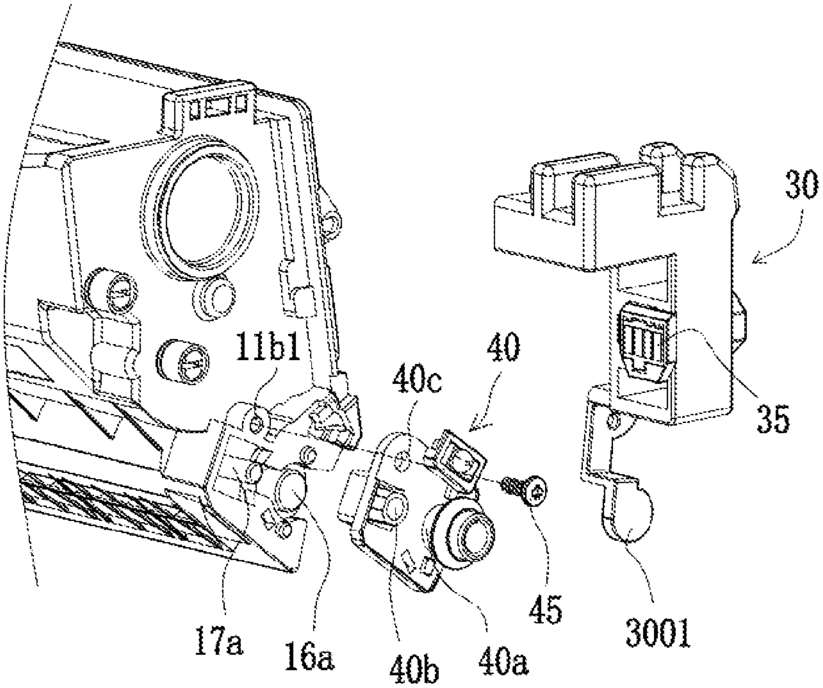

It is preferable to set the electrical contact portion 35*a* of the integrated circuit chip 35 to be relatively movable relative to the second side wall 20. Optionally, it is also possible to set the electrical contact portion 35*a* of the integrated circuit chip 35 to be fixed relative to the second side wall 20. At this time, as shown in FIGS. 23 and 26, an urging mechanism is mounted on the chip assembly 30 or the housing 11 of the developing cartridge 100. The urging mechanism includes a spring 73 and an abutting block 74. The spring 73 is forced to be elastically deformed through the abutment between the abutting block 74 and the inner wall of the drum cartridge 200, and the elastic force of the elastic deformation of the spring 73 is used to provide an urging force, so as to push the integrated circuit chip 35 to the chip adapter electrical contact portion 204 in the drum cartridge 200.

It is worth mentioning that since the integrated circuit chip is disposed on the developing cartridge, the detected member on the developing cartridge can be canceled. Since the integrated circuit chip has the characteristic that information can be written, the information written in the integrated circuit chip can be read by the image forming device. Moreover, the volume can be made very small, so it has the effect of small size and full functions. When the developing cartridge is mounted in the image forming device, the electrical contact portion of the integrated circuit chip faces outwards and comes into contact with an electrical information exchange portion (not shown in the figures) in the image forming device. The developing cartridge is in electrical contact with the image forming device directly through the integrated circuit chip and is read and identified by the image forming device, thereby achieving the functions of detecting whether the developing cartridge is a new cartridge and detecting the information such as the page yield of the developing cartridge. The detected member is canceled, the integrated circuit chip is mounted on the developing cartridge alone, and the integrated circuit chip performs information exchange with the image forming device, so that the functions of confirming whether the developing cartridge is a new cartridge and confirming the information such as the page yield of the developing cartridge are achieved, and it is possible to further reduce the size of the developing cartridge and reduce the manufacturing cost of the developing cartridge.

The Developing Cartridge of the Present Invention has the Following Beneficial Effects:

In order to improve the imaging quality of the developing cartridge, the drum cartridge and the image forming device, the developing cartridge of the present invention is provided with the separating assembly. The separating assembly moves axially under the action of the image forming device, so that the cam on the separating assembly of the developing cartridge is forced to come into contact with the first force receiving member in the drum cartridge. As a result, the entire developing cartridge moves along the second direction, so as to realize the separation of the developer roller in the developing cartridge and the photosensitive drum. The structure of the developing cartridge is simple, and the separation of the developer roller and the photosensitive drum can be performed efficiently. At the same time, the image forming device only needs to be provided with the separation driving member on one side, and does not need to be provided with the separation driving members on the left and right sides as in the prior art, which simplifies the structure of the image forming device and can make the structure of the image forming device more miniaturized. Moreover, in order to keep the integrated circuit chip of the developing cartridge in good contact with the electrical contact portion of the integrated circuit chip when the developing cartridge moves along the second direction to realize the separation of the drum and the roller, and to make the integrated circuit chip not slide relative to the electrical contact portion of the integrated circuit chip following the movement of the developing cartridge to damage the electrical contact portion of the integrated circuit chip, the chip assembly of the developing cartridge is disposed to be movable relative to the housing of the developing cartridge in the present invention. When the housing of the developing cartridge moves relative to the electrical contact portion of the integrated circuit chip in the second direction, the chip assembly will not move in the second direction along with the housing of the developing cartridge. Thus, when the developing cartridge performs the separation action, the chip assembly and the electrical contact portion of the integrated circuit chip are in a fixed position without relative movement, and the chip assembly always maintains a stable electrical connection with the electrical contact portion of the integrated circuit chip, which can achieve good information exchange with the image forming device. It solves the problems in the prior art that when the housing of the developing cartridge moves relative to the electrical contact portion of the integrated circuit chip, the chip assembly moves along with the housing of the developing cartridge, causing the electrical contact portion of the integrated circuit chip to be scratched, which affects the conductive connection between the integrated circuit chip and the electrical contact portion of the integrated circuit chip, thereby affecting the information exchange between the developing cartridge and the image forming device. Therefore, in the developing cartridge of the present invention, the chip assembly can always maintain the stable electrical contact with the electrical contact point of the integrated circuit chip, and maintain good information exchange with the image forming device. Meanwhile, the separating assembly of the developing cartridge is simple and easy to operate. Moreover, if the image forming device with the developing cartridge of the present invention is adopted, it is only necessary to provide one separation driving member on one side of the image forming device, and it is not necessary to provide the separation driving members on the left and right sides of the image forming device as in the prior art. Thus, the separation driving member in the image forming device can be simplified, and the image forming device can be further miniaturized.

Further, the detected member of the developing cartridge and the gear train including the input gear are disposed on the same side of the housing, and the chip assembly and the first conductive member are disposed on the other side of the housing. This arrangement of the developing cartridge solves the problems in the prior art that the chip assembly and the input gear are disposed on the same side, the detected member is disposed on the other side of the housing, the detected member needs to transmit the driving force through the rotating member disposed between the two sides of the housing to drive the detected member to rotate, and therefore the gears need to be provided on both sides of the rotating member, resulting in a complicated driving force transmission system for the developing cartridge. However, the developing cartridge of the present invention only needs to be provided with a gear train on the first side of the housing without gears provided on the second side. Thus, the gear train of the developing cartridge can be set more simply. The chip assembly and the conductive member that are electrically connected to the power supply unit in the image forming device are both disposed on the second side of the housing. Thus, the image forming device only needs to be provided with the power supply unit on one side of the housing, and it is not necessary to provide the power supply units on both sides of the image forming device, which can make the image forming device further miniaturized. The chip of the developing cartridge is disposed on the side away from the gear train, so that the integrated circuit chip is protected from the vibration of the nearby area caused by the rotation of the gears, which affects the stability of the electrical contact between the integrated circuit chip and the image forming device. This arrangement reasonably utilizes the space of the developing cartridge, so that the developing cartridge is more miniaturized, and the detection structure is more stable.

Further, each side of the developing cartridge of the present invention is provided with protrusions. The protrusions are spaced apart from the developer roller by a predetermined distance in the third direction. When the developing cartridge is inserted into the drum cartridge in the third direction, the third protrusion 57 and the sixth protrusion on both sides of the developing cartridge are in contact with the supporting portions on both sides of the drum cartridge, respectively, to bear the weight of the developing cartridge, and it can rotate about the third protrusion 57 and the sixth protrusion. Thus, the photosensitive drum does not need to bear the weight of the developing cartridge to cause damage during the installation process, so that the service life and image quality of the developing cartridge and the drum cartridge can be improved.

Further, the developing cartridge is provided with the idler gear between the input gear and the agitator gear, so that the rotation speed and rotation direction of the agitator in the developing cartridge can be easily adjusted by setting parameters such as the number of teeth and radius of the idler gear, so as to better control the efficiency of the agitator to convey the developer to the supply roller and the developer roller.

Further, the handle of the developing cartridge is disposed at one end away from the developer roller in the third direction, and a recessed portion is provided near the handle, which is convenient for the user to better place his finger when grasping the developing cartridge, and is more convenient for the user to operate. Moreover, the handle of the present invention can be elastically deformed under force. When the developing cartridge is inserted into the image forming device without being mounted in place in the drum cartridge, the handle may be pressed by the guide convex blocks in the image forming device to receive force from the guide convex blocks and force the developing cartridge to rotate about the third protrusion and the sixth protrusion, so that the developer roller and the photosensitive drum move from the separation position to the contact position. Since the handle is elastically deformable, it does not break after being stressed, and the force in the image forming device can be received stably.

Further, the detected member is set as a tooth-missing gear, including a toothed portion and a tooth-missing portion. The driving force can only be transmitted to the toothed portion but not to the tooth-missing portion, so the detected member rotates about the rotation axis at most once, and can only be identified and detected by the image forming device once, so as to prompt the customer whether the developing cartridge is a new one and the type of the toner cartridge, which is convenient for the customer to identify various types of toner cartridges.

Further, the first conductive member of the developing cartridge is made of conductive resin material, can simultaneously support the developer roller and the supply roller, and is provided with a protruding portion that can be in contact with the second conductive member of the drum cartridge. The second conductive member is made of elastically deformable material. When the developing cartridge is mounted, it can rotate about the third protrusion on the protective cover and the sixth protrusion on the second side wall, so that the developer roller and the photosensitive drum move from the separation position to the contact position. At the same time, the first conductive member of the developing cartridge is moved from a position not in contact with the second conductive member to a position in contact with the second conductive member, so that the drum cartridge can identify whether the developing cartridge is mounted in place in the drum cartridge according to whether the developing cartridge is in electrical contact with the drum cartridge.

The above embodiments are only used to illustrate the technical solutions of the present invention, but not to limit them. Although the present invention has been described in detail with reference to the foregoing embodiments, it should be understood by those of ordinary skill in the art that: it is still possible to modify the technical solutions set forth in the foregoing embodiments, or perform equivalent replacements to some of the technical features; and these modifications or replacements do not cause the essence of the corresponding technical solutions to deviate from the spirit and scope of the technical solutions of the embodiments of the present invention.

What is claimed is:

1. A developing cartridge, configured to be detachably mounted in a drum cartridge and to be pushed into an image forming device together with the drum cartridge along a pushing direction, the developing cartridge comprising:

a housing having a developer accommodating portion configured to accommodate developer, the housing having a first end and a second end opposite to the first end in a first direction;

a developer roller configured to rotate about an axis of rotation extending along the first direction;

a driving gear disposed at the first end of the housing and configured to rotate about the axis of rotation extending along the first direction;

a chip having an electrical contact surface located at the second end of the housing; and a holding member configured to support the chip;

wherein when the developing cartridge is mounted in the drum cartridge, the electrical contact surface of the chip faces an upstream side in the pushing direction, and the holding member and the chip are restricted from movement relative to the housing and fixedly mounted on the second end of the housing.

2. The developing cartridge according to claim 1, further comprising a developer filling port and a sealing member located at the second end of the housing in the first direction, wherein the developer filling port is configured to allow the developer to be filled into the developer accommodating portion, and the sealing member is configured to seal the developer filling port to prevent the developer from leaking from the developer accommodating portion.

3. The developing cartridge according to claim 2, further comprising a supported protrusion located at the second end in the first direction, wherein when the developing cartridge is mounted in the drum cartridge, the supported protrusion contacts a supporting portion in the drum cartridge and is supported by the drum cartridge; wherein the housing has a third end and a fourth end in a direction perpendicular to the first direction; wherein the developer roller is located at the third end, and wherein when viewed from the second end of the housing along the first direction, the sealing member is closer to the fourth end of the housing relative to the supported protrusion in the direction perpendicular to the first direction.

4. The developing cartridge according to claim 3, wherein in a direction perpendicular to both the pushing direction of the drum cartridge and the first direction, a distance of the electrical contact surface from the fourth end of the housing is shorter than a distance of the electrical contact surface from the developer roller.

5. The developing cartridge according to claim 3, wherein the developer accommodating portion has a top wall located at the fourth end, and when viewed along the first direction from a side where the second end of the developing cartridge is located, a first imaginary line p that is flush with the top wall of the housing and extends perpendicular to the first direction is made, a second imaginary line r that is flush with a bottommost end of the third end of the housing and extends perpendicular to the first direction is made, a third imaginary line q is made at a center position between the first imaginary line p and the second imaginary lines r, and both the sealing member and the electrical contact surface are located on an upper side of the third imaginary line q.

6. The developing cartridge according to claim 5, wherein the supported protrusion is located on a lower side of the third imaginary line q.

7. The developing cartridge according to claim 2, wherein the developer accommodating portion has a second side wall located at the second end, the developer filling port is a circular opening formed on the second side wall, and the sealing member is a circular cap configured to seal the circular opening.

8. The developing cartridge according to claim 2, further comprising an electrode located at the second end of the housing, wherein the electrode has a developer roller bearing portion supporting the developer roller and is electrically connected to the developer roller, and in a direction perpendicular to both the pushing direction of the drum cartridge and the first direction, both the sealing member and the electrical contact surface are located on an upper side of the electrode.

9. The developing cartridge according to claim 8, wherein the second end of the housing is further provided with an urged portion configured to receive a pushing force from the drum cartridge, and in the direction perpendicular to both the pushing direction of the drum cartridge and the first direction, the urged portion is located on an upper side of the electrode and on a lower side of the electrical contact surface.

10. A developing cartridge, configured to be detachably mounted in a drum cartridge and to be pushed into an image forming device together with the drum cartridge along a pushing direction, the developing cartridge comprising:

a housing having a developer accommodating portion configured to accommodate developer, the housing having a first end and a second end opposite to the first end in a first direction;

a developer roller configured to rotate about an axis of rotation extending along the first direction;

a driving gear located at the first end of the housing and configured to rotate about the axis of rotation extending along the first direction;

a chip having an electrical contact surface located at the second end of the housing; and a developer filling port located at the second end of the housing and configured to allow the developer to be filled into the developer accommodating portion;

a sealing member configured to seal the developer filling port to prevent the developer from leaking from the developer accommodating portion;

wherein when the developing cartridge is mounted in the drum cartridge, the electrical contact surface of the chip faces an upstream side in the pushing direction;

wherein when viewed from the second end of the housing along a first direction, at least a part of the sealing member is located on an upstream side of the electrical contact surface in the pushing direction.

11. The developing cartridge according to claim 10, further comprising a supported protrusion capable of being supported by the drum cartridge, wherein in a direction perpendicular to both the first direction and the pushing direction, and the supported protrusion is located at a lower end of the sealing member.

12. The developing cartridge according to claim 11, wherein the housing has a third end and a fourth end in a direction perpendicular to the first direction, the developer roller is located at the third end, the developer accommodating portion has a top wall located at the fourth end, and when viewed along the first direction from a side where the second end of the developing cartridge is located, a first imaginary line p that is flush with the top wall of the housing and extends perpendicular to the first direction is made, a second imaginary line r that is flush with a bottommost end of the third end of the housing and extends perpendicular to the first direction is made, a third imaginary line q is made at a center position between the first imaginary line p and the second imaginary lines r, and both the sealing member and the electrical contact surface are located on an upper side of the third imaginary line q.

13. The developing cartridge according to claim 12, wherein the supported protrusion is located on a lower side of the third imaginary line q.

14. The developing cartridge according to claim 10, further comprising an electrode located at the second end of the housing, wherein the electrode has a developer roller bearing portion supporting the developer roller and is electrically connected to the developer roller, and in a direction perpendicular to both the pushing direction of the drum cartridge and the first direction, both the sealing member and the electrical contact surface are located on an upper side of the electrode.

15. The developing cartridge according to claim 14, wherein the second end of the housing is further provided with an urged portion configured to receive a pushing force from the drum cartridge, and in the direction perpendicular to both the pushing direction of the drum cartridge and the first direction, the urged portion is located on an upper side of the electrode and on a lower side of the electrical contact surface.

* * * * *